US008267764B1

(12) United States Patent
Aoki et al.

(10) Patent No.: US 8,267,764 B1

(45) Date of Patent: Sep. 18, 2012

(54) WAGERING GAME HAVING ENHANCEMENTS TO QUEUED OUTCOMES

(75) Inventors: Dion K. Aoki, Henderson, NV (US); Joel Jaffe, Glenview, IL (US); Pamela Smith, Chicago, IL (US); Dylan SeLegue, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 11 days.

(21) Appl. No.: 13/091,802

(22) Filed: Apr. 21, 2011

(51) Int. Cl.
*A63F 9/24* (2006.01)
*A63F 13/00* (2006.01)

(52) U.S. Cl. ............................... 463/16; 463/20; 463/25

(58) Field of Classification Search .............. 463/16–20, 463/25–29
See application file for complete search history.

(56) References Cited

U.S. PATENT DOCUMENTS

| | | | |
|---|---|---|---|
| 6,533,273 B2 | 3/2003 | Cole et al. | |
| 6,612,574 B1 | 9/2003 | Cole et al. | |
| 6,612,575 B1 | 9/2003 | Cole et al. | |
| 7,011,581 B2 | 3/2006 | Cole et al. | |
| 7,618,316 B2 | 11/2009 | Cole et al. | |
| 7,749,074 B2 | 7/2010 | Cole et al. | |
| 8,021,226 B2 * | 9/2011 | Souza et al. | 463/20 |
| 2002/0151349 A1 | 10/2002 | Joshi | |
| 2003/0064790 A1 * | 4/2003 | Hughs-Baird et al. | 463/20 |
| 2005/0055113 A1 | 3/2005 | Gauselmann | |
| 2006/0084486 A1 | 4/2006 | Belger et al. | |
| 2006/0183535 A1 * | 8/2006 | Marks et al. | 463/20 |
| 2008/0108431 A1 * | 5/2008 | Cuddy et al. | 463/27 |
| 2009/0111561 A1 * | 4/2009 | Dewaal et al. | 463/20 |
| 2011/0021266 A1 * | 1/2011 | Jaffe et al. | 463/25 |
| 2011/0207525 A1 * | 8/2011 | Allen et al. | 463/25 |
| 2012/0015707 A1 * | 1/2012 | Hornik et al. | 463/20 |

FOREIGN PATENT DOCUMENTS

| | | |
|---|---|---|
| WO | WO 2009/114472 | 9/2009 |

* cited by examiner

*Primary Examiner* — Milap Shah

(74) *Attorney, Agent, or Firm* — Nixon Peabody LLP

(57) ABSTRACT

A gaming system for playing a wagering game includes a wager input device configured to receive a wager to play the wagering game, at least one display configured to display the wagering game and at least one controller operatively configured to verify receipt of a wager and an extra wager, randomly generate an outcome of the wagering game, randomly generate an award modifier, determine if the outcome is a winning outcome, determine an award associated with the outcome if the outcome is a winning outcome, modify the award via the award modifier to yield a modified award, award the modified award to the player, and, separately, store the modified award in a stored award field accessible through a secondary game.

33 Claims, 13 Drawing Sheets

WAGERING GAME HAVING ENHANCEMENTS TO QUEUED OUTCOMES

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus, and more particularly to gaming systems having stored awards and re-awarding of stored awards, and methods for playing wagering games with stored awards and re-awarding of stored awards.

BACKGROUND OF THE INVENTION

Gaming terminals, such as slot machines, video poker machines, and the like, have been a cornerstone of the gaming industry for several years. Generally, the popularity of such machines with players is dependent on the likelihood, or perceived likelihood, of winning money at the machine, as well as the intrinsic entertainment value of the machine relative to other available gaming options. Where the available gaming options include a number of competing machines, and the expectation of winning at each machine is roughly the same or believed to be the same, players are likely to be attracted to the most entertaining and exciting machines. Consequently, operators strive to employ the most entertaining and exciting machines, features, and enhancements available since such machines attract frequent play and, hence, increased profitability.

One method that may be employed to enhance the entertainment value of a game is the opportunity for a player to re-win an award that the player won in a previous play of a game. The present invention is directed to a gaming system that allows a player to re-win awards.

SUMMARY OF THE INVENTION

In at least some aspects of the present concepts, a gaming system for playing a wagering game includes a wager input device configured to receive a wager to play the wagering game, at least one display device configured to display the wagering game, and at least one controller. The at least one controller is operatively configured to randomly generate an outcome of the wagering game, randomly generate an award modifier, determine if the outcome is a winning outcome, determine an award associated with the outcome if the outcome is a winning outcome and award the award to the player, modify the award via the award modifier to yield a modified award, and store the modified award in a stored award field accessible through a stored award field trigger. In at least some other aspects of the present concepts, it is contemplated to both award the modified award and to store the modified award in the stored award field.

In at least some aspects of the present concepts, a gaming system for playing a wagering game includes a wager input device configured to receive a wager to play the wagering game, at least one display device configured to display the wagering game, and at least one controller. The at least one controller is operatively configured to randomly generate an outcome of the wagering game, determine if the outcome is a winning outcome, determine an award associated with the outcome if the outcome is a winning outcome, award the award to the player, store the award in a stored award position in a stored award field accessible through a stored award field trigger in a wagering game or in a secondary game, and modify a stored award in the stored award field to increase a value of the stored award subsequent to the storing of the award in the stored award field.

In at least some aspects of the present concepts, a gaming system for playing a wagering game includes a wager input device configured to receive a wager to play the wagering game, at least one display device configured to display the wagering game; and at least one controller operatively configured to store a plurality of stored award values in a stored award field, the stored award values being generated using prior awards, corresponding to winning outcomes in the wagering game, or being generated randomly in the absence of a winning outcome in the wagering game, at least some of the stored award values being modified by an award modifier contemporaneously with or subsequent to storing in the stored award field. The at least one controller is also operatively configured to calculate an expected value of the stored award values in the stored award field, conduct a bonus game utilizing the stored award values, the bonus game having an expected value commensurate with the calculated expected value of the stored award values in the stored award field, determine an award associated with the bonus game, award the award associated with bonus game, and clear the stored award values in the stored award field.

In at least some aspects of the present concepts, a method of conducting a wagering game on a gaming system includes the acts of receiving a wager via a wagering input device to play the wagering game on the gaming system, displaying an award modifier on at least one display device, using the award modifier to modify an award associated with a winning outcome in the wagering game to yield a modified award, storing the modified award as a stored award in a stored award field, the stored award field being accessible through a stored award field trigger in a wagering game or in a secondary game, and repeating the aforementioned acts to at least partially populate the stored award field with stored awards. The method further includes accessing the stored awards via a wagering game or a secondary game and awarding at least one of the stored awards. According to one aspect of the present invention, a gaming system for playing a wagering game includes a wager input device configured to receive a wager to play the wagering game, at least one display configured to display the wagering game and at least one controller operatively configured to verify receipt of a wager and an extra wager, randomly generate an outcome of the wagering game, randomly generate an award modifier, determine if the outcome is a winning outcome, determine an award associated with the outcome if the outcome is a winning outcome, modify the award via the award modifier to yield a modified award, award the modified award to the player, and, separately, store the modified award in a stored award field accessible through a secondary game.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
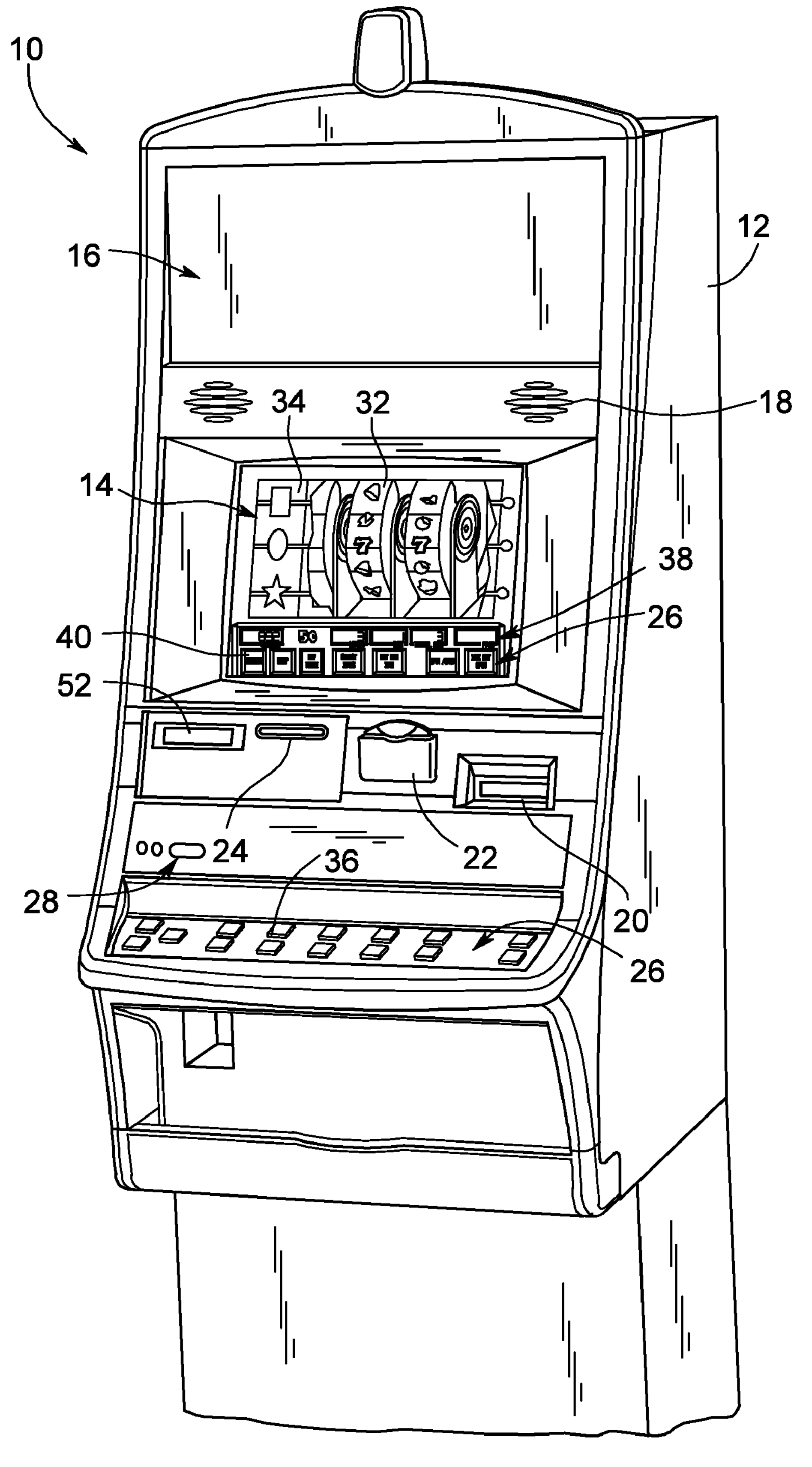
FIG. 1 is a perspective view of an example of a free-standing wagering game machine utilizable in accord with the present concepts.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
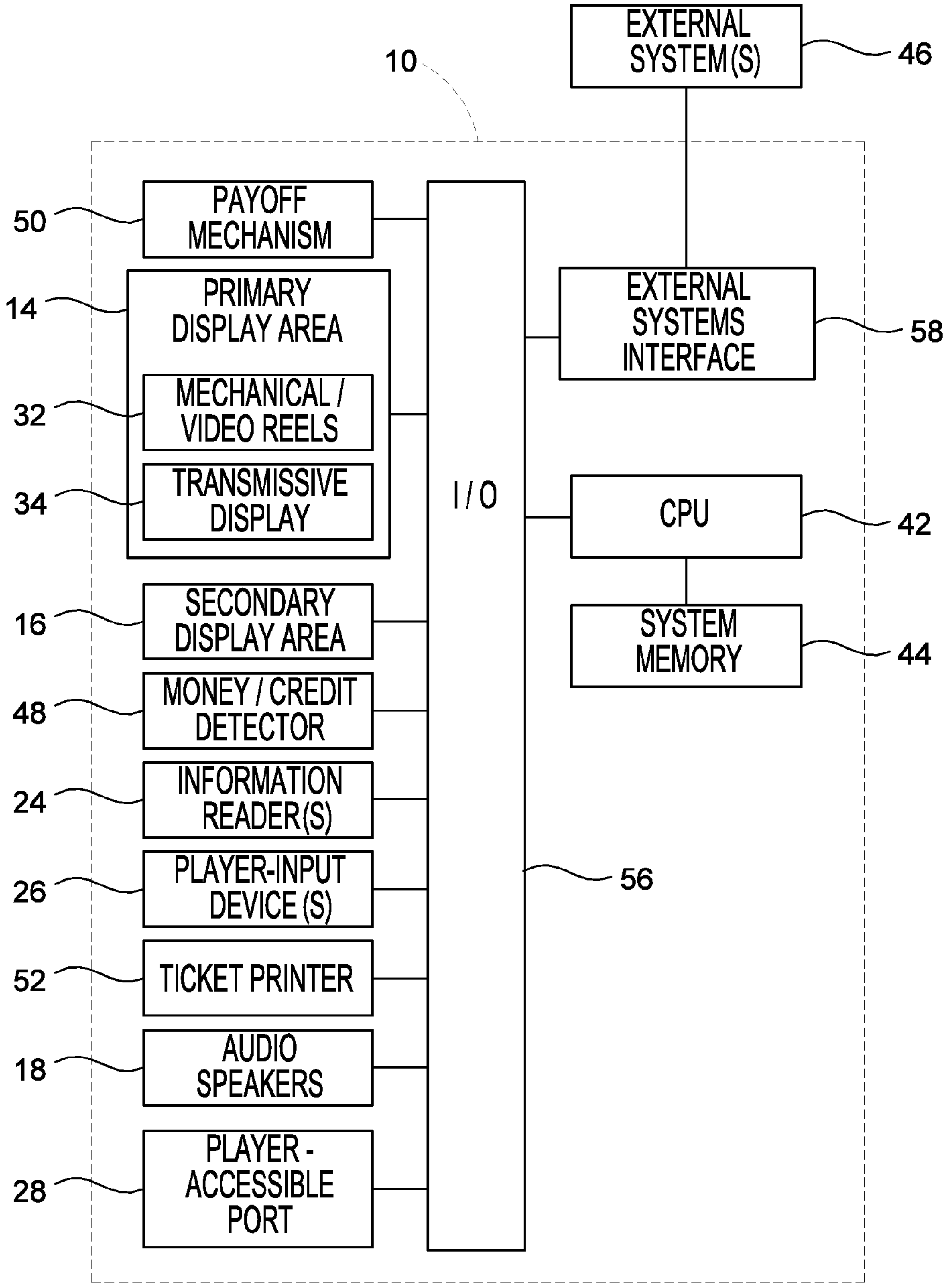
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH- EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
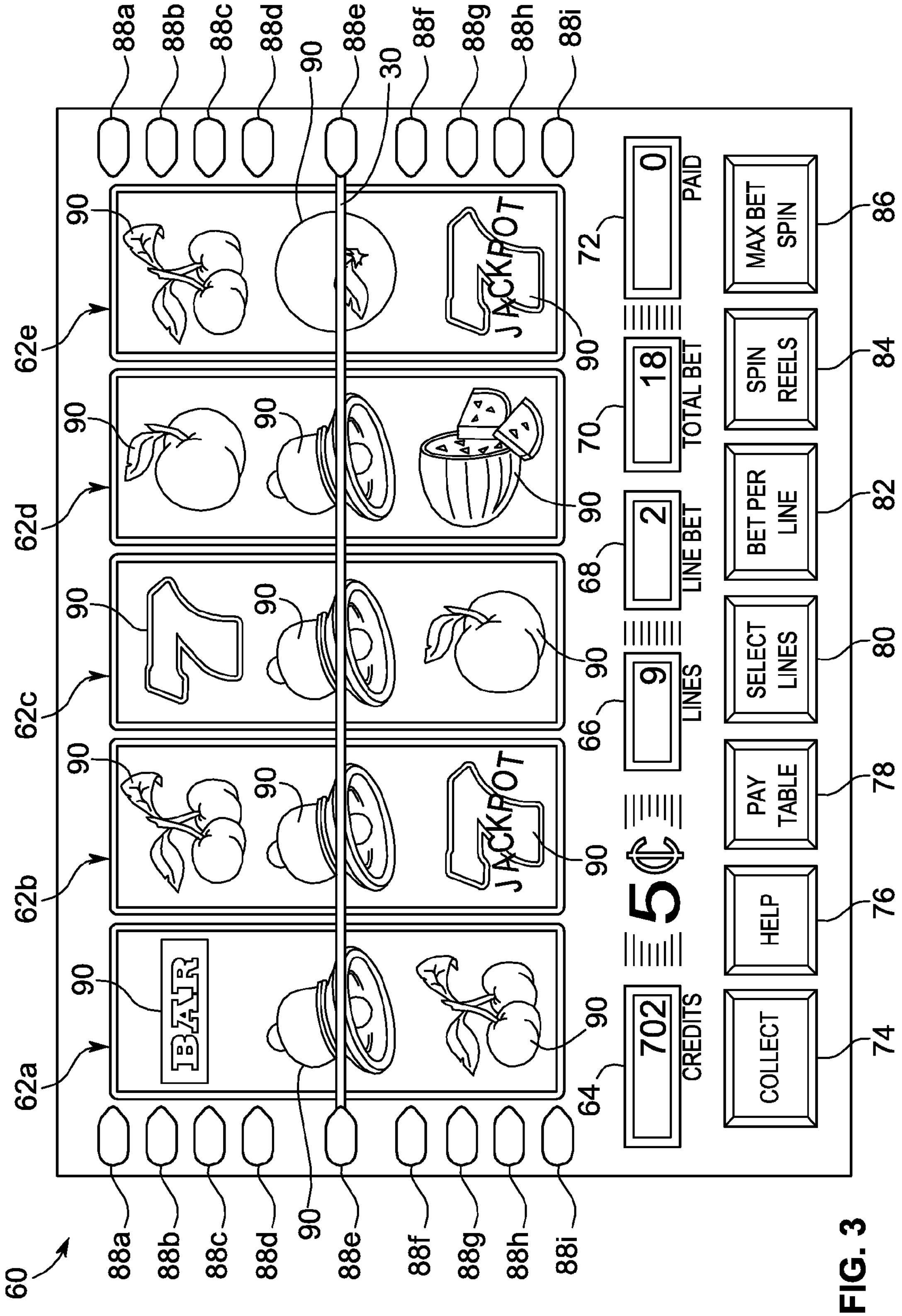
FIG. 3 is a representation of a basic-game screen of a wagering game displayed on a wagering game machine.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a*-62*e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a*-62*e*; and a "max bet spin" button 86 for wagering a maximum number of credits and moving the reels 62*a*-62*e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a*-62*e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a*-62*e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Described below with respect to FIGS. 4-12 are wagering games that are portal applications that are able to be placed on any WMS Gaming Inc. Portal B enabled base wagering game so as to enable ready interchange of the secondary games. A portal is an instrumentality that may provide personalized capabilities, provide a pathway to other content, or combinations thereof, and may use distributed applications, different numbers and types of software based components that couple two or more applications to enable, for example, data transfer between the applications, as is described by way of example in U.S. Published Patent Application Nos. 2009/0305776 A1, 2010/0075746 A1, and 2011/0070940 A1 each of which is incorporated by reference herein in its entirety. WO 2009/114472 A9 is also incorporated by reference herein in its entirety.

In at least some aspects of the present concepts, the various portal applications described herein below, require an extra bet equal to one-half of the total line bet to enable the particular bonus modes described below. Absent such optional extra bet, a player may be enabled to merely enjoy a conventional Jackpot Party bonus game, or the like, or other conventional bonus game. However, by input of such extra bet, every winning combination during wagering game play conducted with the benefit of the required extra bet randomly increases one present value in the Jackpot Party Bonus by up to 10× the base game win. For example, if the total line bet is 20 credits, the extra bet required is equal to 10 credits and, if the total line bet is 30 credits, the extra bet required is equal to 15 credits, and such extra bets would enable the noted game feature.

Figure 4:
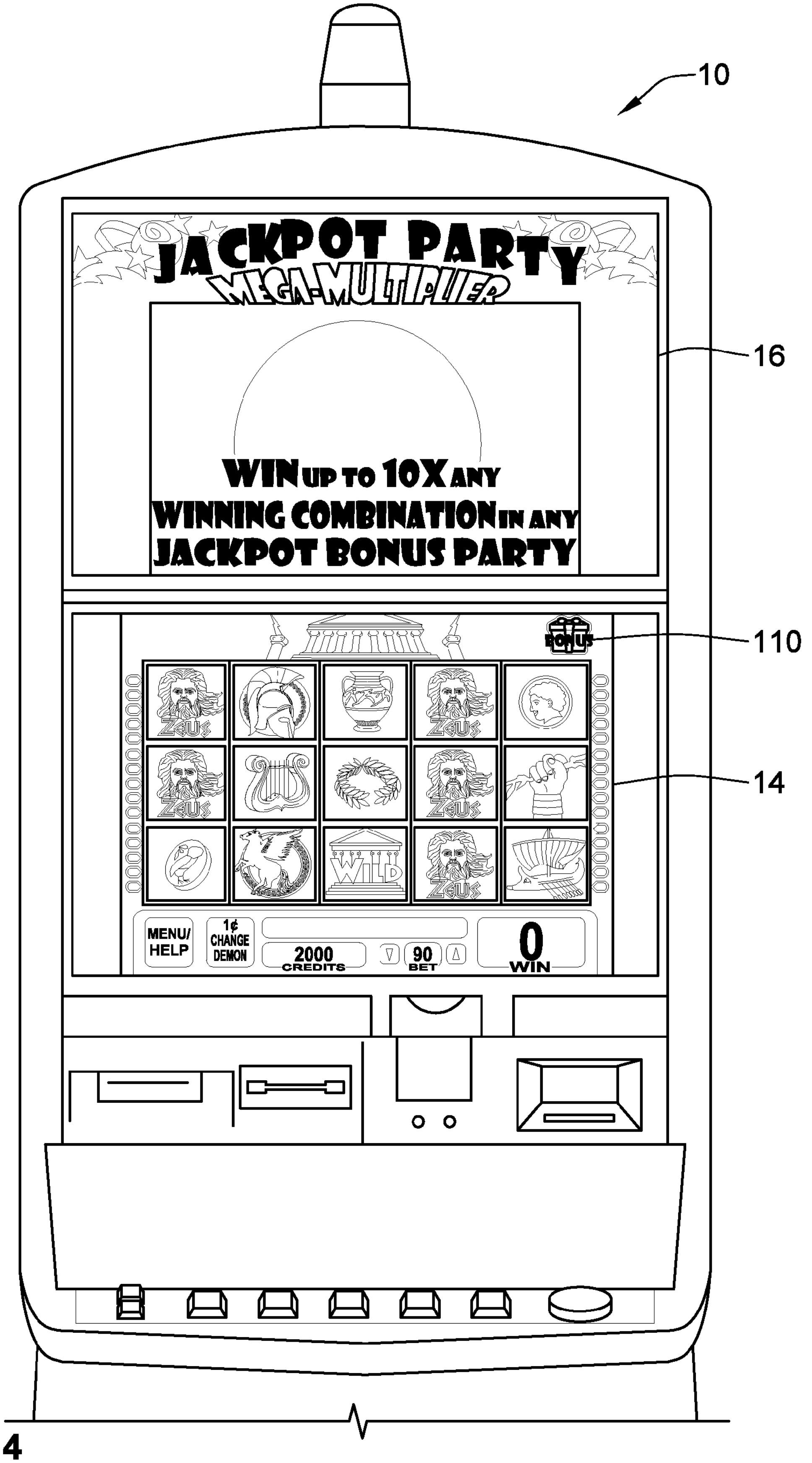
FIG. 4 is a representation of a wagering game machine displaying a wagering game in accord with at least some aspects of the present concepts.

FIG. 4 depicts a representation of a "Jackpot Party Mega-Multiplier" wagering game machine 10 displaying, in accord with at least some aspects of the present concepts, a wagering game displayed on a primary display 14 and an attract display displayed on a secondary display 16 disposed above the primary display. On the secondary display 16 of FIG. 4 is displayed a message of "Win up to 10× any Winning Combination in any Jackpot Party Bonus". Also shown on the primary display 14 of FIG. 4 is an icon 110 which, in this instance, is a "Bonus" icon displayed above the rightmost reel. Of course, the icon 110, described below, may be displayed anywhere on any display element on or near the wagering game machine 10, and preferably, but not necessarily, on the primary display 16. Thus, by way of example, the icon 110 could be displayed on a display embodied within a push button 36 on the button panel 26, such as is shown in U.S. Pat. No. 7,775,872, which is incorporated by reference in its entirety herein. Alternatively, in lieu of or in addition to a display of such icon 110, other indicators may be used to a similar effect as the herein described icon such as audio output (e.g., a unique bonus sound or music) or lights adjacent static graphical elements corresponding to an identified icon.

Figure 5:
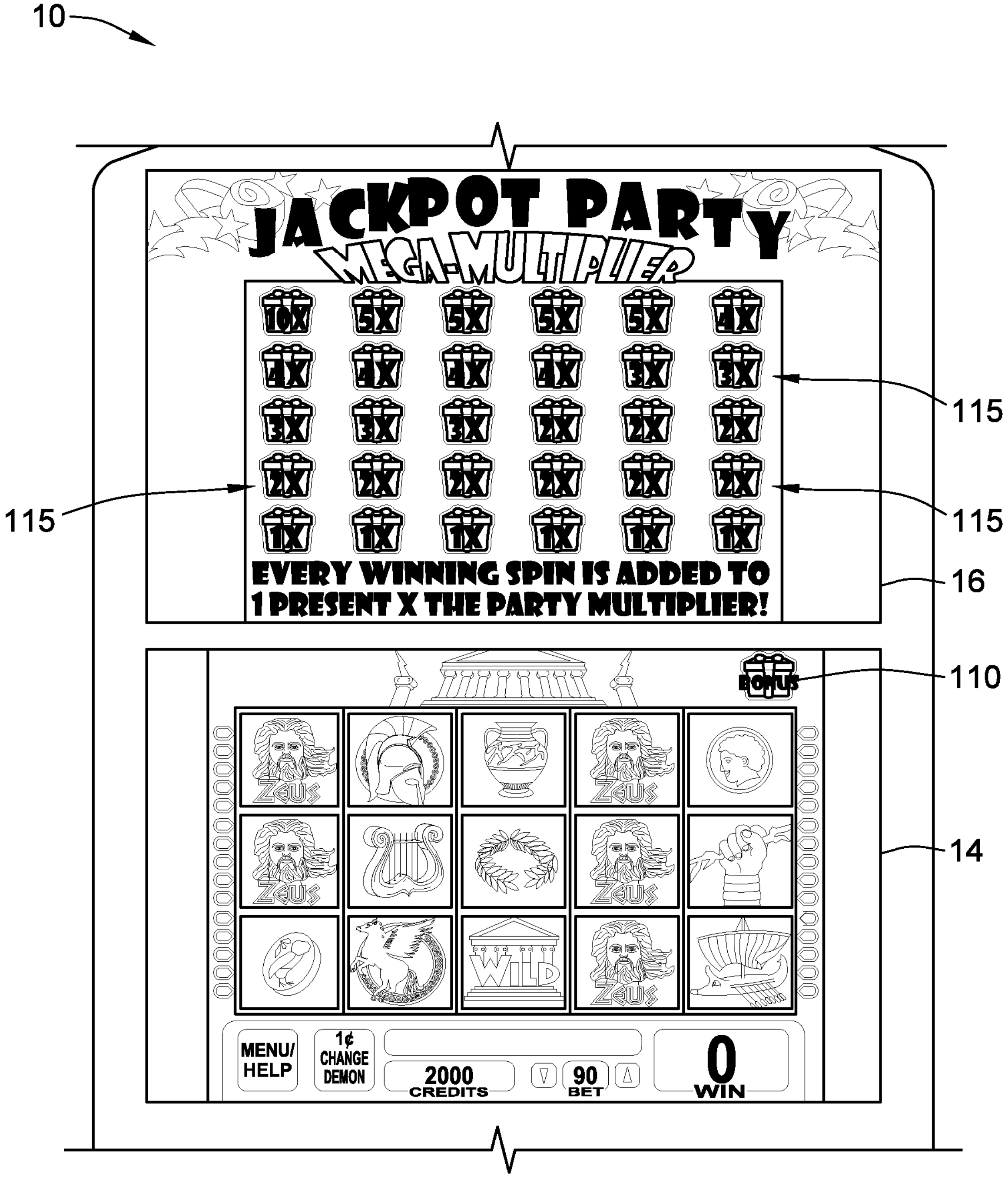
FIG. 5 is a representation of a wagering game machine displaying a wagering game in accord with at least some aspects of the present concepts showing a top screen featuring a Jackpot Bonus arrangement of selectable elements.

FIG. 5 shows a representation of the wagering game machine 10 of FIG. 4 again displaying a wagering game in accord with at least some aspects of the present concepts in the primary display 14, but more particularly showing on the secondary display 16 an arrangement of predetermined modifiers 115, here multiplier values, that will be randomly assigned to a corresponding winning outcome in the wagering game. As noted at the bottom of the secondary display 16 of FIG. 5, "Every Winning Spin Is Added To 1 Present X The Party Multiplier". Thus, by way of example, if the total line bet is 20 credits and the player inputs the requisite required extra bet of 10 credits (½ of the total line bet) to enable the Jackpot Party Mega-Multiplier game feature, an award associated with any winning outcome in the base wagering game is modified by a randomly selected one of the modifiers 115. In the embodiment shown in FIG. 5, the modifiers 115 are multipliers and a randomly selected multiplier is used to multiply an award associated with a winning outcome in the base wagering game, up to ten times the base game win (e.g., from 1× up to and including 10×). The randomly selected modifier (e.g., multiplier) is optionally displayed in association with the icon 110 during game play, prior to a reveal of an outcome. Still further, the icon 110 may optionally be displayed only when the controller has determined that an outcome is a winning outcome, so as to heighten the player's anticipation and increase excitement. Although the modifier is shown as being juxtaposed over the icon 110, the modifier could alternatively be disposed adjacent the icon or elsewhere.

Figure 6:
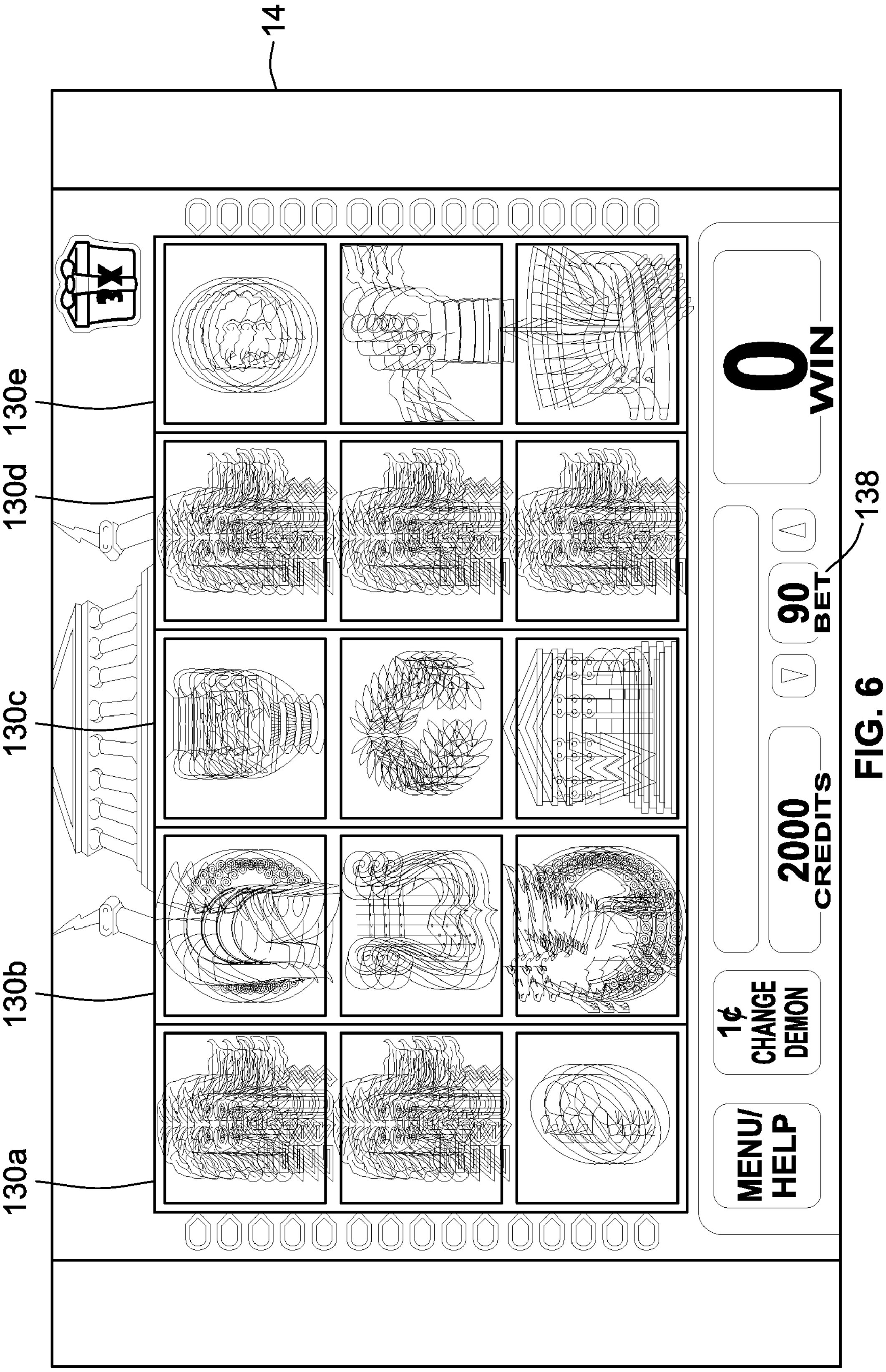
FIG. 6 is a representation of reels spinning on a wagering game in accord with at least some aspects of the present concepts showing, at an upper right of the display, a random Jackpot Party Multiplier or Bonus.

FIG. 6 shows an initiated spin of the reels 130*a*-130*e*, wherein the reels are shown in a state of flux to indicate spinning of the reels. As shown in the bet meter 138 at the bottom of the primary display 14, the player in this example has input a 60 credit total line bet and an extra 30 credit bet (½ of the total line bet) for a total of 90 credits. In the upper right portion of the primary display 16, the icon 110 is shown with a multiplier value of "3×" overlaid thereover. This multiplier is a modifier 115 randomly selected from the field of potential modifiers depicted in FIG. 5. In accord with the embodiment of the present concepts represented in FIG. 6, every play of the wagering game satisfying the wager requirements is assigned a modifier (e.g., a multiplier, etc.) that is optionally displayed in association with the icon 110, as noted above.

Figure 7:
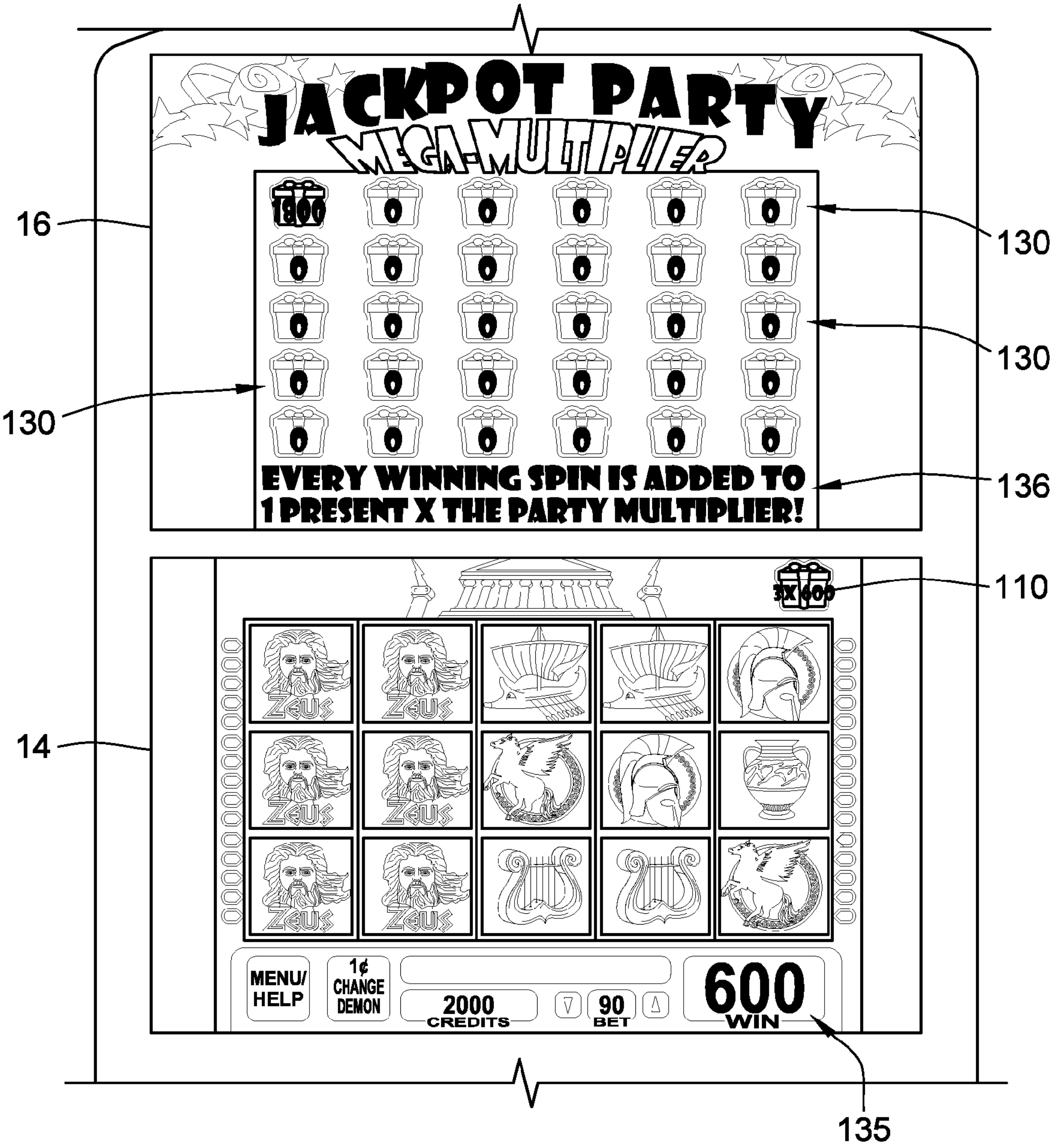
FIG. 7 is a representation of a wagering game machine displaying an example of an aspect of the present concepts including associating a Bonus Credit Present with a selectable element available in a pick field during play of a Jackpot Party Bonus.

FIG. 7 shows the conclusion of the spin of FIG. 6 wherein a winning outcome is indicated on the reels and is associated with an award of 600 credits, as is shown in the WIN meter 135 at the bottom right side of the primary display 14. Icon 110 is shown now to not only indicate the previously displayed multiplier of "3×," but also an operation of multiplication of such multiplier by the award of 600 credits. Correspondingly, the product of this operation, 1800 credits, is shown to be stored as a stored award 130, represented in the secondary display 16 of FIG. 7 as a Bonus Credit Present. The secondary display 16 itself optionally indicates an instruction or comment, such as banner 136 stating "Every Winning Spin Is Added To 1 Present X The Party Multiplier". Were, for example, the award associated with a particular winning outcome to be 50 credits and the modifier randomly determined to be the "5×" multiplier of FIG. 5, the award would be modified to yield a modified award of 250 credits and this value would be stored as a stored award 130. In accord with the present concepts disclosed herein, the standard award (i.e., the paytable award prior to the aforementioned modification) is awarded to the player and the modified award is stored in a stored award field.

As a visual indicator, the value(s) of stored awards 130, here Bonus Credit Presents, that are available to the player in the Jackpot Party Mega-Multiplier pick field are advantageously, but not necessarily, displayed to the player via the secondary display 16, such as is depicted in FIG. 7. At the point illustrated in FIG. 7, the player has just associated the product of the multiplier and award from the base wagering game (i.e., 1800 credits in the example shown) to a stored award 130 (e.g., a Bonus Credit Present) in the Jackpot Party Mega-Multiplier game feature and the remaining selectable elements shown in the secondary display 16 of FIG. 7 each indicate a present value of "0" credits. Although the value of the stored award 130 is shown for the player's convenience in FIG. 7, that which is represented in the secondary display 16 is not the pick field itself, but is rather a stored award field 132.

The stored award field 132 is optionally displayed to the player on the secondary display 16 following the player's attainment of one stored award 130 and where not inconsistent with continued wagering game play. Thus, during a player's on-going gaming session, the stored award field 132 is intermittently displayed on the secondary display 16, with other game displays (e.g., an ordinary bonus game) being displayed in lieu of the stored award field. In another alternative, the stored award field 132 is intermittently displayed as one display screen amongst a plurality of other display screens graphics (e.g., general game theme graphics, pay table, etc.), with each of the display screens being cycled for display in accord with a predetermined sequence or routine. In yet another alternative, the store award field 132 may simply be a background field or may be available for viewing by the player upon request.

A player may opt to initiate the Jackpot Party Mega-Multiplier game feature at any time as long as they are eligible (e.g., they have at least one Bonus Credit Present available to them in the pick field). In other embodiments, eligibility could optionally be further constrained to depend on one or more other variables within the player's control (e.g., sustained wager level, etc.) or triggers (e.g., random outcome, achievement of target performance level, etc.).

Figure 8:
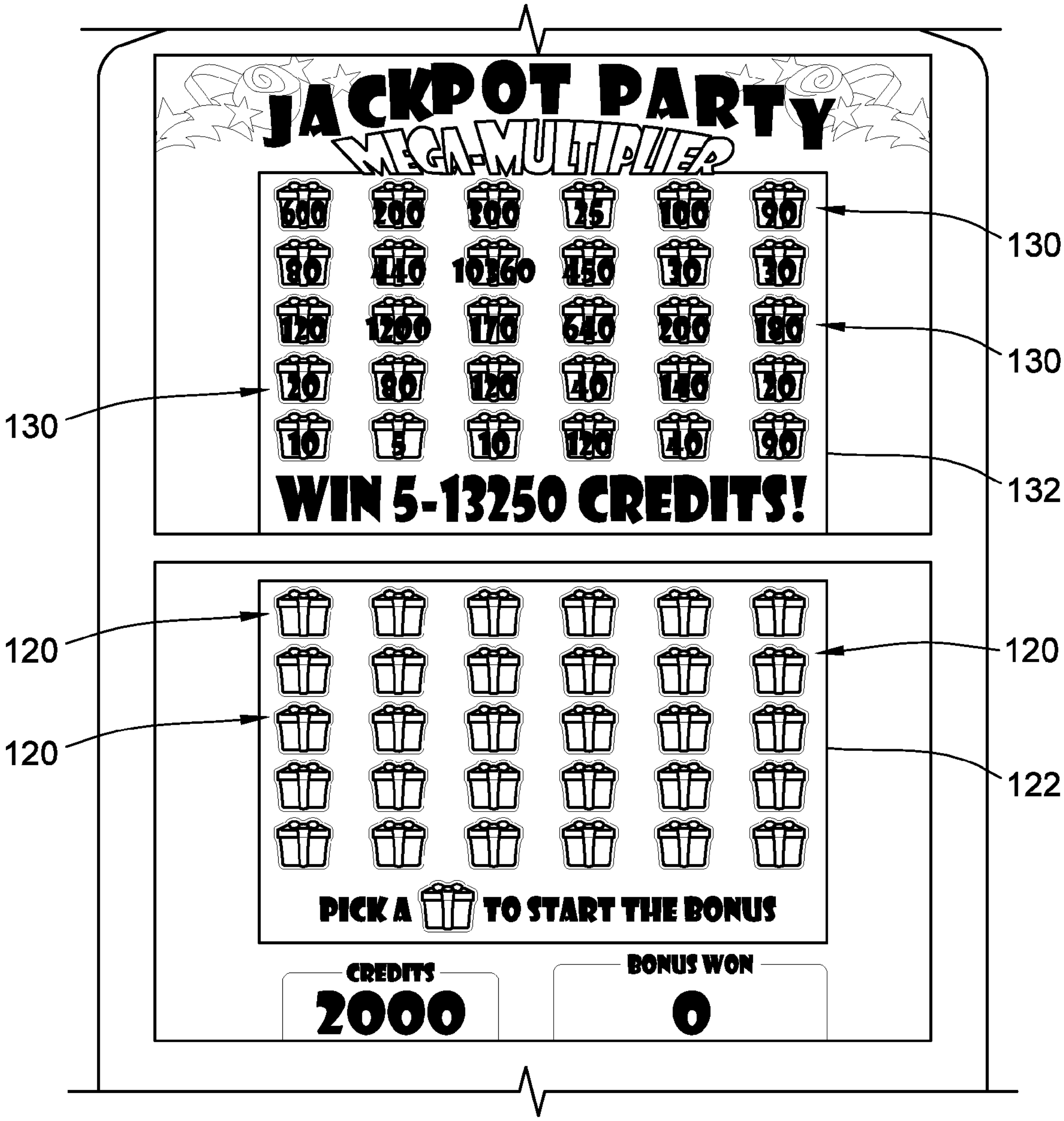
FIG. 8 is a representation of a wagering game machine displaying an example of an aspect of the present concepts wherein the Jackpot Party Bonus is triggered.

FIG. 8 shows an example of a Jackpot Party Mega-Multiplier game feature wherein a player has accumulated numerous stored awards 130, shown as Bonus Credit Presents, during play of a base-wagering game or optionally, other types of bonus or secondary games. By way of example, at least some aspects of the present concepts include providing the opportunity for obtaining stored awards 130 in a bonus game such as, but not limited to, a free-spin game feature arising from a base-wagering game in which a player input the required extra bet (e.g., one-half of the total line bet). Thus, a player's ability to attain stored awards 130 is not necessarily limited to the base-wagering game.

In FIG. 8, a player is presented with a pick field 122 of selectable elements 120 in the primary display 14. On the secondary display 16, the player's accumulated stored awards 130 are shown with, for example, values of 600 credits, 200 credits, 300 credits, 25 credits, 100 credits, and 90 credits across the top row. Displayed at the bottom of the secondary display 16 is a banner stating "WIN 5—13,250 CREDITS" representing the highest amount that a player could win if they were to select selectable elements 120 on the primary display 14 corresponding to the highest value Bonus Credit Prizes (e.g., the stored awards 130 corresponding to the 10,360 credit value, 1,200 credit value, 650 credit value, 600 credit value, and 450 credit value). The stored awards 130 indicated in the secondary display 16 are shuffled, in effect, by randomly associating each of the stored awards 130 (e.g., Bonus Credit Prizes) with a selectable element 120 in the primary display 14 pick field 122, the particular stored award associated with each selectable element being concealed until after the selectable element is selected by a player. The player is then permitted to pick selectable elements 120 from the pick field 122. By way of example, the player's selections may occur one-at-a-time, with a reveal before each successive pick, or all at once followed by a reveal of the plural picks.

In the aspect of the present concepts shown in FIG. 8, a player is permitted to pick five selectable elements 120. In one aspect of the Jackpot Party Mega-Multiplier game, the only values or outcome associated with the selectable elements 120 are those stored awards 130 accumulated by the player during wagering game play in association with wagers meeting a predetermined criteria such as, but not limited to, the extra bet of one-half the total line bet. Thus, as shown in FIG. 8, there is a one-to-one correspondence between the number of stored awards 130 in the stored award field 132 and the selectable elements 120 in the pick field so that each selectable element 120 corresponds to one stored award 130. In yet another aspect of the Jackpot Party Mega-Multiplier game, one or more (e.g., two, three, etc.) selection-ending outcomes may be optionally randomly interspersed amongst the selectable elements 120 to add an element of risk to the Jackpot Party Mega-Multiplier game. Likewise, one or more (e.g., two, three, etc.) selection-preserving outcomes may be randomly interspersed amongst the selectable elements 120 to provide a potential counter the risk posed by the selection-ending outcomes. In such an embodiment, a player may optionally be permitted to replace one or more of such selection-ending outcomes with stored awards 130.

Although FIG. 8 shows an example in which a player is permitted five picks and the player has accumulated 30 stored awards 130 during prior game play, it bears repeating that, in at least some aspects of the present concepts, a player having at least one stored award is permitted to access, at any time, the Jackpot Party Mega-Multiplier game or like game wherein a player is permitted to select one or more selectable elements 120 from a pick field including stored awards 130 accumulated by the player. If a player were to initiate the Jackpot Party Mega-Multiplier game, for example, after obtaining only one stored award 130, the controller would associate that stored award with a randomly selected one of the selectable elements 120 (see FIG. 8) and the remaining selectable elements would be randomly associated with award values, selection-ending outcomes, selection-preserving outcomes, etc. For a pick field of 30 selectable elements, a player afforded five picks would then have a one-in-six chance of winning the stored award 130 again. If the player selects the selectable element 120 corresponding to the stored award 130, then the player wins their prior award again.

Following completion of the player's permitted picks of the selectable elements 120 in the pick field 122, a number of possible game variants are possible. As a first variant, the stored awards remaining in the pick field are cleared and the player is no longer permitted to attempt to win those stored awards again. The player must then start over with a cleared stored award field 132 and the player would not be enabled to engage in the Jackpot Party Mega-Multiplier game or the like until at least such a time as they have achieved one or more new stored awards 130. As a second variant, one or more of the players non-selected stored awards 130 may be returned to the player's stored award field. For example, one randomly-selected stored award 130 is returned to the player's stored award field for each selectable element 120 selected by the player that corresponds to one of the player's stored awards, thus conditioning the contemporaneous partial re-population of the stored award field 132 on the player's performance in the Jackpot Party Mega-Multiplier game or the like. Thus, a player selecting two selectable elements 120 that correspond to the player's stored awards would have two randomly selected stored awards 130 (those corresponding to non-selected selectable elements) returned to the stored award field 132. As a third variant, the Jackpot Party Mega-Multiplier game or the like may comprise multiple tiers or levels, with the stored awards 130 advancing with the player. For example, if a player of the Jackpot Party Mega-Multiplier game selects five selectable elements 120 without selecting a selection-ending outcome, the player is permitted to advance to a new pick field and the player's non-selected stored awards 130 are used in this new pick field. Thus, a player may be permitted multiple attempts to win the stored awards 130. Optionally, with such advancement, the stored awards 130 may be further enhanced.

Figure 9:
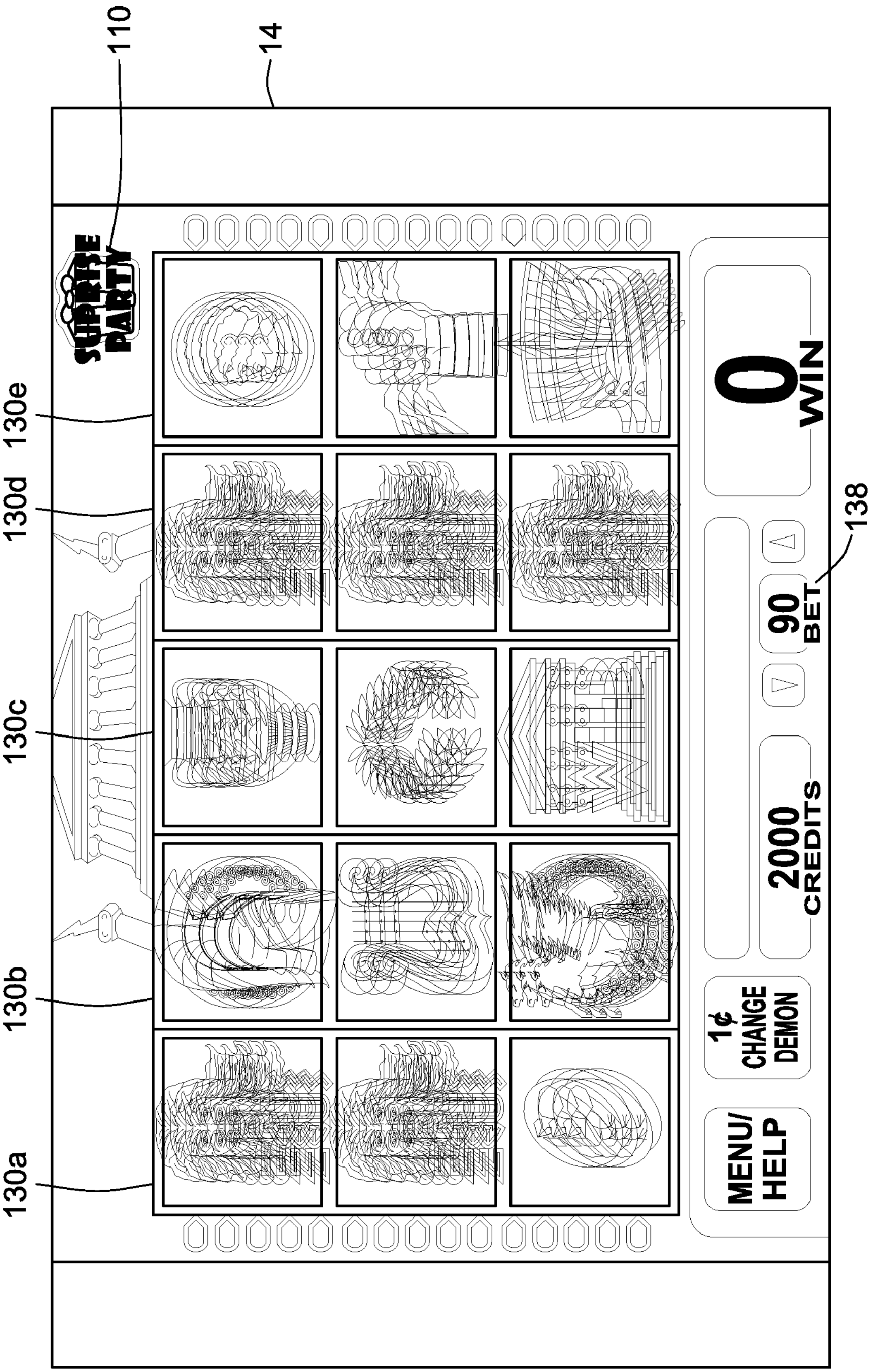
FIG. 9 is a representation of reels spinning on a wagering game in accord with at least some aspects of the present concepts showing, at an upper right of the display, a Surprise Party icon.

FIG. 9 shows an initiated spin of the reels 130*a*-130*e*, wherein the reels are shown in a state of flux. As shown in the bet meter 138 at the bottom of the primary display 14, the player in this example has input a 60 credit total line bet and an extra 30 credit bet (½ of the total line bet) for a total of 90 credits. In the upper right portion of the primary display 16, the icon 110 is shown with a banner of "Surprise Party" overlaid thereon. In one aspect, this "Surprise Party" icon 110 is a randomly selected result (e.g., a mystery trigger) of the aforementioned Jackpot Party Mega-Multiplier game variants that is presented in lieu of a multiplier value. In other aspects, the manifestation of the "Surprise Party" icon 110, in lieu of a multiplier value, is selected based on one or more other potential triggers or influencing factors (e.g., amount of wager, wager history, prior game outcome(s), etc.).

If the "Surprise Party" icon 110 does manifest during the player's wagering game, following the players wager and input of the required extra wager, however defined, and the triggering spin results in a winning combination, the player is awarded an immediate "Jackpot Party Bonus," such as that shown by way of example in U.S. Pat. No. 6,190,255, which is incorporated herein by reference in its entirety. In accord with at least some of the present concepts, the award associated with the winning combination in the wagering game is utilized as the base value for the selectable elements in the Jackpot Party Bonus. However, no matter what the variant of the Jackpot Party Bonus, in accord with the denoted "Surprise Party" game feature the cumulative value of the player's Jackpot Party Bonus is both immediately awarded to the player and is also added as a stored award 130 to the stored award field 132.

In an alternative configuration, a multiplier is associated with the "Surprise Party," similar to the multiplier shown by way of example in FIG. 6, and the award corresponding to the winning combination is multiplied by the multiplier and stored as a stored award 130, such as described above. In this case, however, the "Surprise Party" function (and optionally icon) is carried through into the stored award 130 so that, if the stored award corresponding to the "Surprise Party" is selected by the player from the pick field 122, the player is then taken to a Jackpot Party Bonus, to be returned to the Jackpot Party Mega-Multiplier game upon completion of the Jackpot Party Bonus. Similarly, in yet another alternative configuration, the award corresponding to the winning combination is directly stored as a stored award 130, such as described above, but the stored award itself is associated with the "Surprise Party" so that, if the stored award corresponding to the "Surprise Party" is selected by the player from the pick field 122, the player is then taken to the "Surprise Party" and the result thereof used to modify the stored award that is then awarded to the player. The player would then be permitted to continue the Jackpot Party Mega-Multiplier game or like game through completion.

Continuing with the above examples of both award values and functions being carried through to a stored award 130 in a stored award field 132, base wagering game spins may also be used to populate stored awards with functions, such as a selection-preserving outcome (e.g., a party saver) or a selection-ending outcome (e.g., a party pooper) that can come into play in the pick field 122 should the re-award of the Jackpot Party Mega-Multiplier be triggered. These functions may be attached to a seed value in the stored award or may alternatively uniquely occupy a stored award position. Alternatively, of course, such functions, such as a selection-preserving outcome (e.g., a party saver) or a selection-ending outcome (e.g., a party pooper), may be associated with the icon 110 (see, e.g., FIG. 6) and may then be appended to the winning outcome as a seed value and inserted into a stored award 130 in the stored award field 132 or may be inserted into a separate stored award in the stored award field with a corresponding optional seed value.

In another alternative, functions such as a selection-preserving outcome (e.g., a party saver) or a selection-ending outcome (e.g., a party pooper), whether originally associated with the icon 110 (see, e.g., FIG. 6) or whether arising from a symbol on a base wagering game reel or card or the like, may be saved in a separate stored function field or queue and then, once the Jackpot Party Mega-Multiplier game populates the pick field 122. In some aspects, the lowest values of stored awards in the stored award field 132 are removed and/or the highest values of stored awards in the stored award field are utilized in the pick field 122 in combination with the stored functions in the separate stored function field.

An additional function that may be borne by icon 110 could include a wild feature. One example of a wild feature could place a predetermined number of wild symbols into a stored award field or stored function field, as appropriate, and upon a triggering of the re-award, the activated wild feature throws a predetermined plurality of random wilds, or expanding wilds, or some other manner of wilds appropriate to the wild feature, on the screen and then evaluates the resulting symbol matrix.

Figure 10:
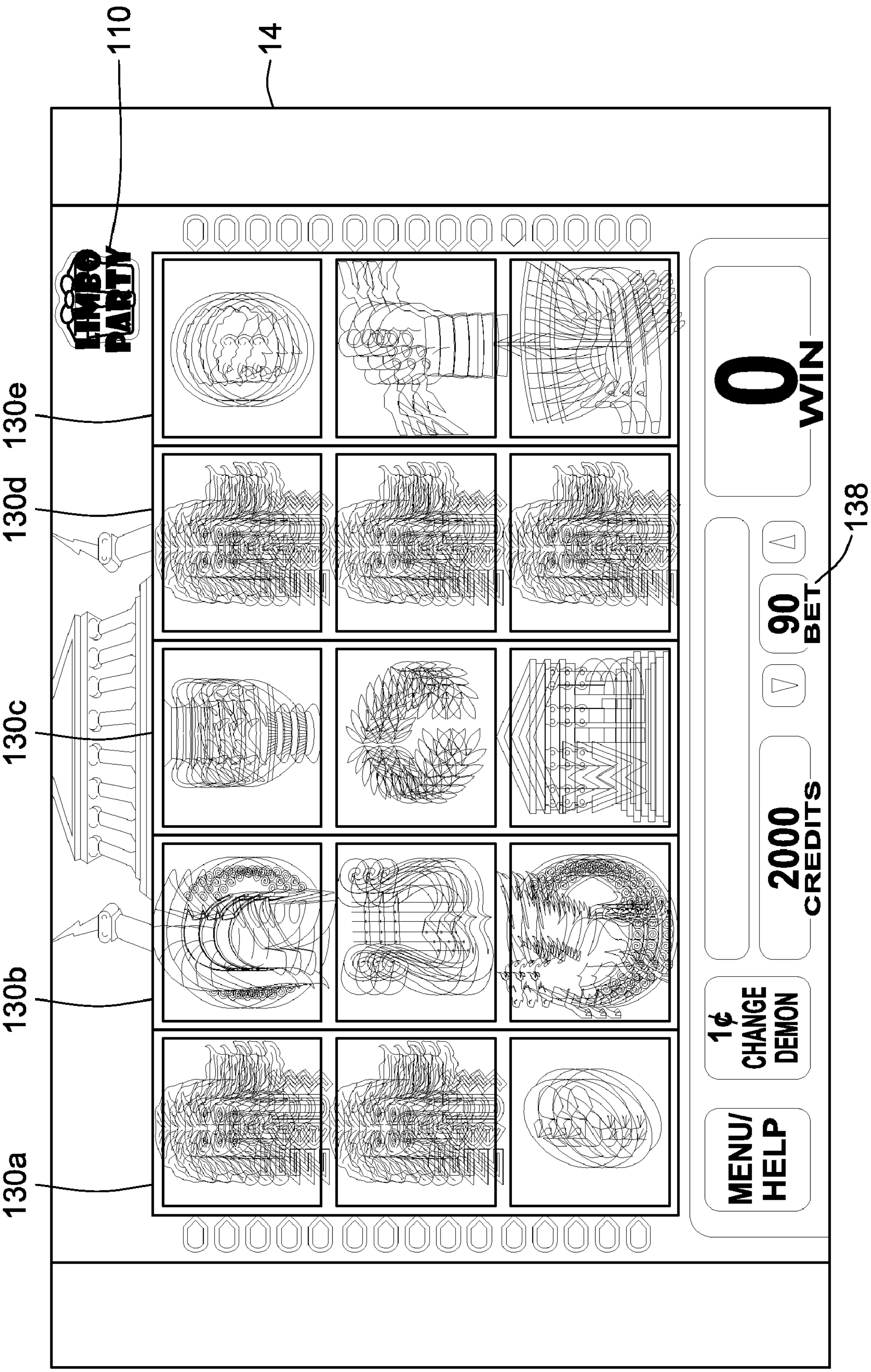
FIG. 10 is a representation of reels spinning on a wagering game in accord with at least some aspects of the present concepts showing, at an upper right of the display, a Limbo Party icon.

FIG. 10 shows an initiated spin of the reels 130*a*-130*e*, wherein the reels are shown in a state of flux. As shown in the bet meter 138 at the bottom of the primary display 14, the player in this example has input a 60 credit total line bet and an extra 30 credit bet (½ of the total line bet) for a total of 90 credits. In the upper right portion of the primary display 16, the icon 110 is shown with a banner of "Limbo Party" overlaid thereon. In one aspect, this "Limbo Party" icon 110 is a randomly selected result (e.g., a mystery trigger) of the aforementioned Jackpot Party Mega-Multiplier game variants that is presented in lieu of a multiplier value. In other aspects, the manifestation of the "Limbo Party" icon 110, in lieu of a multiplier value, is selected based on one or more other potential triggers or influencing factors (e.g., amount of wager, wager history, prior game outcome(s), etc.). If the "Limbo Party" icon 110 does manifest during the player's wagering game, following the player's wager and input of the required extra wager, however defined, and the triggering spin results in a winning combination, the player is awarded an immediate "Limbo Party Bonus," such as is shown by way of example in FIG. 11.

Figure 11:
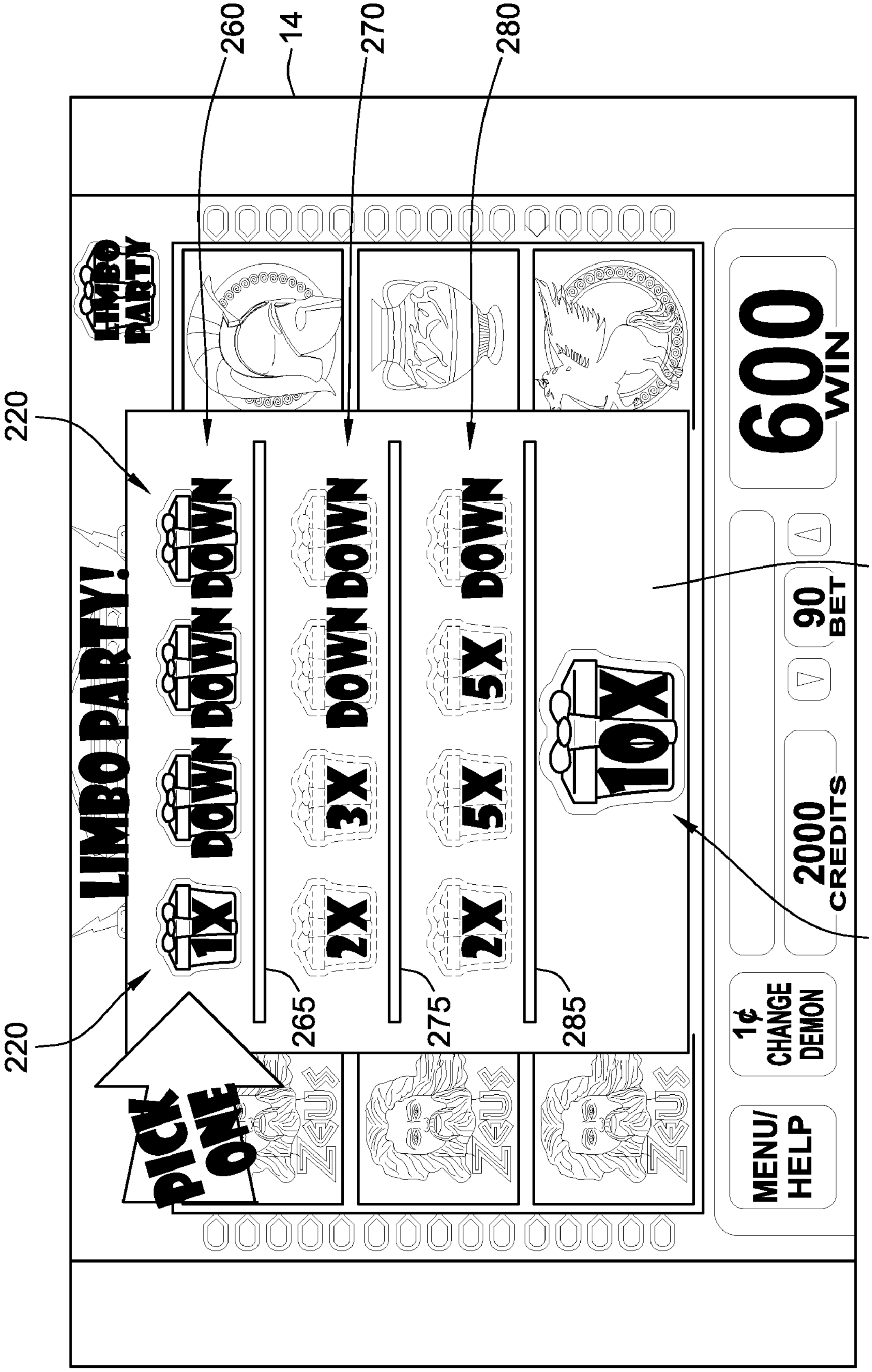
FIG. 11 is a representation of a wagering game machine displaying an example of an aspect of the present concepts showing a Limbo Party Bonus with a tiered pick field.

In the "Limbo Party Bonus" of FIG. 11, a player is presented with a first pick field 260 comprising a plurality of selectable elements 220. As depicted, the first pick field 260 comprises four selectable elements, each being associated with a predefined outcome randomly selected from a plurality of potential outcomes. FIG. 11 shows an example where a player has selected the leftmost selectable element 220 in the first pick field 260 and the selected one of the selectable elements 220 has revealed the outcome associated therewith, "1×". The non-selected ones of the selectable elements 220 have also been revealed to shown the outcomes associated therewith, with each of those non-selected selectable elements 220 being associated with a "Down" outcome. Whereas the selectable elements 220 in the first pick field 260, second pick field 270, and third pick field 280 are initially concealed from the player, it is desired in at least some aspects for the final selectable element 240 to be revealed so as to be clearly visible to the player prior to the commencement of player selections in the "Limbo Party Bonus" game play.

In accord with the "Limbo Party Bonus," were the player to have selected one of the selectable elements 220 being associated with a "Down" outcome, the player would have been passed down, below the limbo bar 265, to the second pick field 270. The second pick field 270 also comprises four selectable elements, each being associated with a predefined outcome randomly selected from a plurality of potential outcomes. FIG. 11 shows that, were a player to have continued from the first pick field 260 to the second pick field 270, the available selectable elements 220 would have been associated with outcomes of "2×," "3×," "Down," and "Down," respectively. Likewise, were the player to have then selected one of the selectable elements 220 in the second pick field 270 associated with a "Down" outcome, the player would have been passed down, below the limbo bar 275, to the third pick field 280. The third pick field 280 also comprises four selectable elements, each being associated with a predefined outcome randomly selected from a plurality of potential outcomes. FIG. 11 shows that, were a player to have continued into the third pick field 280, the available selectable elements 220 would have been associated with outcomes of "2×," "5×," "5×," and "Down," respectively. If the player were then to have selected the selectable element 220 associated with the "Down" outcome, the player would have then passed down below the limbo bar 285, to the highest value multiplier 240 of "10×". It is to be noted that, although the outcomes associated with the displayed selectable elements 220 are ordered in the illustrated example, the distribution of the outcomes as well as the values associated with the outcomes may be varied. For example, higher multipliers and fewer "Down" outcomes could be utilized. As the example is shown, the number of "Down" outcomes decreases with each pick level to make progression in the "Limbo Party Bonus" progressively more difficult to go lower and lower, where the higher outcome values reside.

The final multiplier value selected by the player is then multiplied by the award associated with the winning outcome that completed the triggering requirement for the "Limbo Party Bonus" and the product thereof is then associated with a stored award 130 of the stored award field 132. Thus, in the example of FIGS. 10-11, if the player was to have obtained an award of 150 credits in association with the outcome of the base-wagering game, the "1×" multiplier achieved in the "Limbo Party Bonus" would then yield a product of 150 credits, which would then be associated with a stored award 130 in the stored award field 132. Were the player to have reached the "10×" bonus 240 in the "Limbo Party Bonus," the product of 1500 credits would be associated with a stored award 130 in the stored award field 132.

In accord with the above-described "Limbo Party Bonus," and contrary to the random assignment of a multiplier value via icon 110 as shown in FIG. 6, the player is permitted the opportunity to directly affect the value of the multiplier to be applied to the award value of the base wagering game winning outcome and then applied to a stored award 130 for later utilization in the Jackpot Party Mega-Multiplier game feature.

In some aspects of "Limbo Party Bonus," the award corresponding to the winning combination is directly stored as a stored award 130, such as described above, but the stored award itself is associated with the "Limbo Party Bonus" so that, if the stored award corresponding to the "Limbo Party Bonus" is selected by the player from the pick field 122, the player is then taken to the "Limbo Party Bonus" and the result thereof used to modify the stored award that is then awarded to the player. The player would then be permitted to continue the Jackpot Party Mega-Multiplier game or like game through completion.

As one variant on the above-described aspects of the "Limbo Party Bonus," one or more selection-ending outcomes may be optionally introduced into one or more of the first pick field 260, second pick field 270, and third pick field 280 to add an element of risk to the "Limbo Party Bonus" game. The multiplier assigned for multiplication with the award value of the base wagering game winning outcome would then be the highest attained value of multiplier prior to selection of a selection-ending outcome. Alternatively, a player could lose any multiplier yet achieved, defaulting to a base "1×" multiplier, upon a selection of a selectable element 220 associated with a selection-ending outcome. In such aspects, it would be advantageous to also present the player with an "out" allowing them to withdraw from further selections and accept the multiplier associated with the last-selected selectable element 220. Yet further, one or more selection-preserving outcomes may be randomly interspersed amongst the selectable elements 220 to provide a potential counter the risk posed by the selection-ending outcomes.

In accord with the examples provided above with respect to FIGS. 9-11, it is to be understood that any manner of secondary bonus (e.g., game mechanics and themes may be varied) may be made accessible to a player via the icon 110 which, upon the achievement of a winning outcome, is stored in association with a player's stored award 130 for later utilization in a Jackpot Party Mega-Multiplier game, or a like game, which may be a portal-based game or a non-portal-based game.

Figure 12:
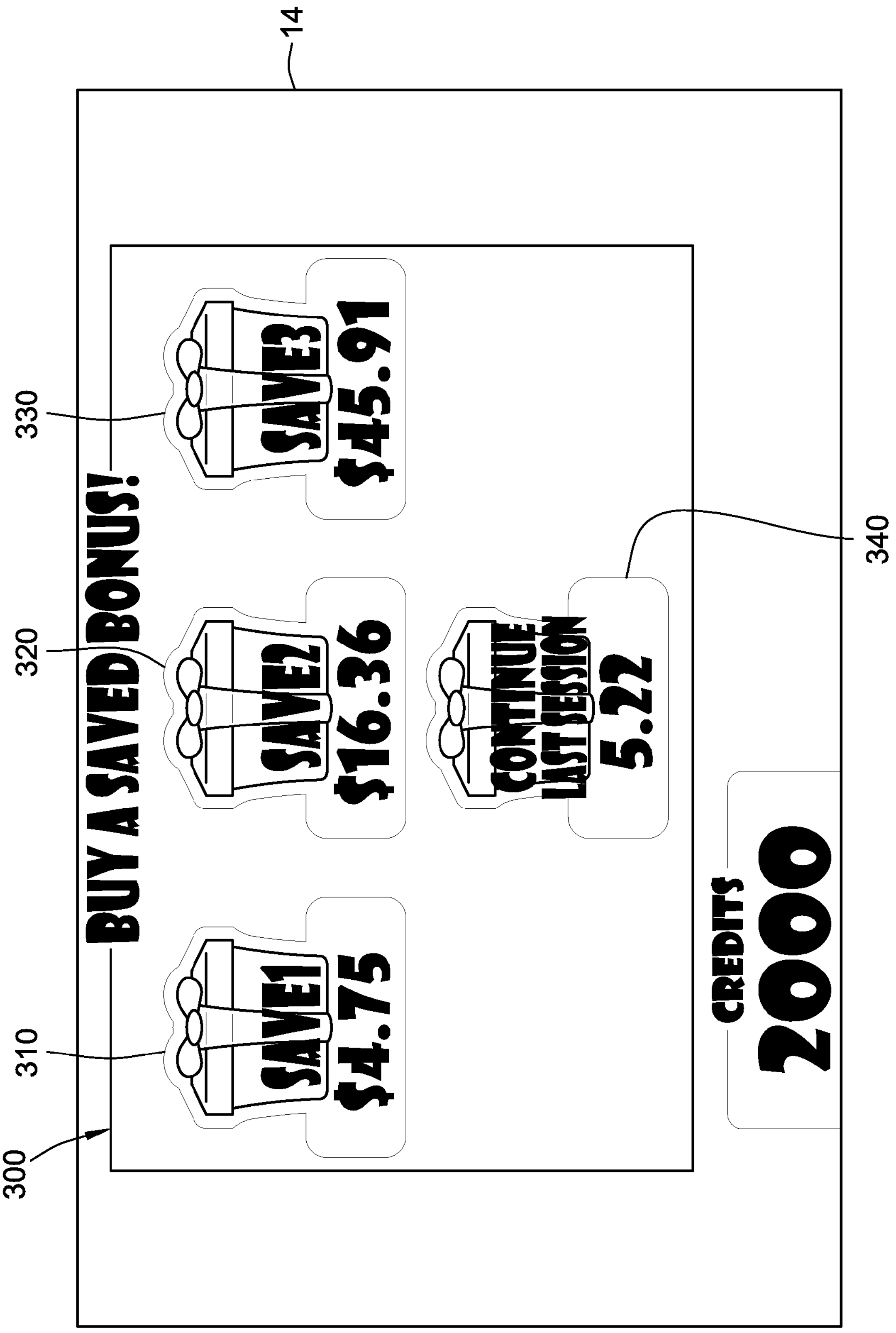
FIG. 12 is a representation of a wagering game machine displaying an example of an aspect of the present concepts showing a presentation to a player of an option to save and buy their bonus session.

FIG. 12 shows an example of a screen wherein a player is provided the option to save and buy their stored awards 130 in the stored award field 132 for future play or buying into their last unplayed session. By purchasing a saved stored award field 132, such as "Save3" bonus having a cost of $45.91, the player is able to later play a Jackpot Party Mega-Multiplier game using the stored award field 132 corresponding to the "Save3" bonus. In this manner, if a player wants to terminate a gaming session before conducting a game, such as a Jackpot Party Mega-Multiplier portal game utilizing the stored values 130, the player is permitted to save the game state for later play. Alternatively, if the player conducts the game utilizing the stored values and would like to save that particular stored award field for future use, the player is optionally permitted to save it and then play it at a later date by purchasing the stored award field for a value equal to the expected value, optionally including a rake. Thus, if a player liked their stored award field 132, but couldn't play any longer, they can save it then play it out some other time. However, if the player already played their stored award field 132 and wanted to recreate it for future game play, they would be permitted to save it and pay for the expected value of the stored award field for future use, or optionally to simply restore it at a later time and, at that time, pay for the expected value of the stored award field. In at least some aspects, the price for replicating the stored award field would be equal to the expected value of the field as it existed at the time of save, optionally less a casino rake (e.g., 5%, 10%, etc.)

In one aspect, a player may be required to "play through" the stored award field 132 before the end of their gaming session and they may then be permitted to buy into the same stored award field at a later time or date. For example, information defining the stored award field is saved in relation to a player account. In this manner, the player has to play the stored award field, but they are able to buy into it later. A player that might have a favorite distribution of stored awards 130, such as one really big value and a bunch of little values, providing a high volatility, may opt to just save it and buy it and play it whenever he or she wants.

In general, the above examples are illustrative of general concepts disclosed herein including boosting or enhancing a player's award for a winning outcome prior to storing the award in the stored award field or of altering a seed amount that is to be stored in a stored award field or providing an arbitrary seed amount in a stored award field.

Figure 13:
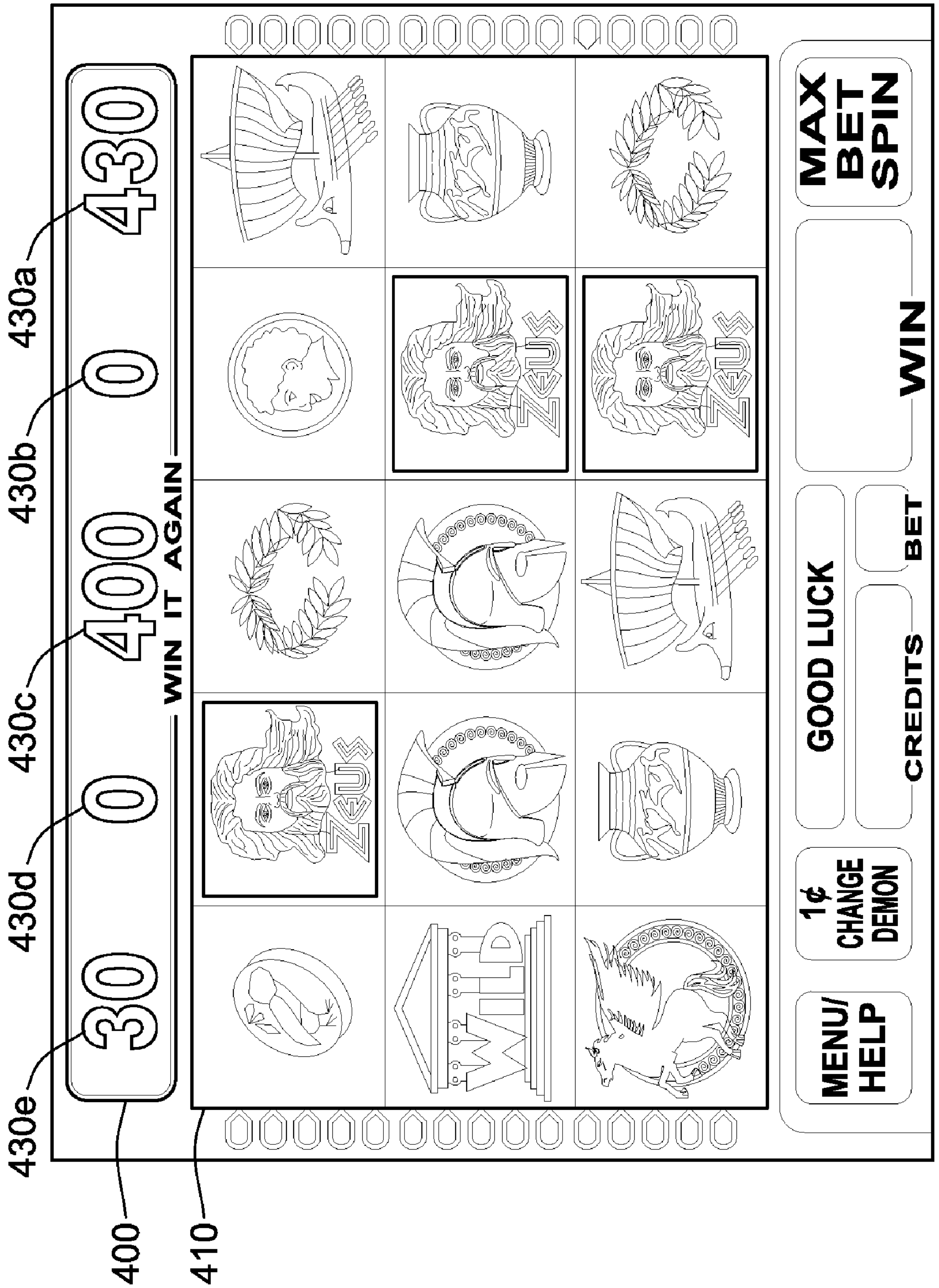
FIG. 13 is a representation of a wagering game machine display showing a wagering game and a stored award field in accord with at least some aspects of the present concepts showing in the form of a 1×5 array.

Further, although the stored award field 132 is represented in the illustrated examples as a 5×6 array of 30 stored awards 130, the stored award field may consist of smaller or larger fields of stored awards or different arrangements of stored award fields. By way of example, such stored award field 132 could comprise a 1×5 array as shown in FIG. 13, a 1×6 array, or a 1×10 array. In FIG. 13, the stored award field comprises stored award 130*a*-130*e* respectively associated with stored award values of 430, 0, 400, 0, and 30 credits. In FIG. 13, the stored award field 132 is shown to be displayed above the wagering game reels, denoted generally by reference numeral 410.

Still further, although the stored award field 132 described in relation to FIG. 8 or FIG. 13, for example, was deployable at-will by the player, the present concepts may instead alternatively require the player to satisfy some particular triggering condition or conditions to trigger the game(s) that utilize(s) the stored award field. Thus, for example, the re-awarding of the stored awards 130 in the stored award field 132 may require that the player achieve a particular outcome in a base wagering game to win, outright, all of the accumulated stored awards, or some sub-set thereof. Alternatively, a re-award trigger may be resident in a $4^{th}$ reel or some other random outcome display separate from the base wagering game display (e.g., reels). This manner of triggering would facilitate general use of the present concepts in portal applications.

Additionally, although the stored awards 130 in the stored award fields 132 described in association with FIG. 8 was static, the present concepts include non-static or dynamic award fields. For example, a stored award field 132, such as that shown in FIG. 13, could be a "first in first out" (FIFO) process with a limited number of stored award positions, such as a first stored award position (e.g., 130*a*) through a fifth stored award position (e.g., 130*e*), wherein each new stored award entry is input into an entry point of the stored award field (e.g., the first stored award position 130*a*), thereby causing each of the remaining stored awards to shift by one stored award position (e.g., the previous stored award in the first stored award position 130*a* being moved to the second award position 130*b*, and so on, with the stored award that was in the fifth stored award position 130*e* being moved out of play). It is further contemplated that, in at least some aspects of the present concepts, non-winning outcomes (e.g., a "0" credits outcome, are stored as stored awards in a dynamic stored award field, such as is shown by way of example in FIG. 13).

Whereas the above examples populated the stored awards field 132 with a stored award 130 upon achievement of a winning outcome following the input of a required extra wager, in at least some aspects of the present concepts a positive stored value could be inserted into the stored awards field as a mystery boost where there is no such winning outcome. For example, a player that inputs the required extra wager could have a spin of the reels that is a losing outcome. Nonetheless, as a result of the losing outcome, a separate determination is made to determine if a mystery boost is to be awarded and a random mystery boost (e.g., 40 credits), is input as a stored award 130. In other variants, a mystery boost could boost every stored award value in the stored award field 132 or a mystery boost could boost a subset of stored award values in the stored award field (e.g., one or two stored award values, etc.).

In another variant corresponding with non-traditional or non-winning outcomes, a player that inputs the required extra wager and achieves a spin of the reels, a deal of cards, or the like, that results a losing outcome could be randomly presented with a challenge, quest or objective that would, if successful, place a predetermined or randomly determined stored award in a stored award field. For example, in the WMS Gaming Zeus-themed games (see, e.g., FIG. 13), a challenge could be issued to a player having just received a losing outcome after inputting the required extra wager, the challenge informing the player that if he or she is able to achieve certain results in a certain number of spins (e.g., obtain two lightning bolt symbols in each of the next five spins, etc.), they will be receive a stored award or both an award and a stored award. The challenge could comprise any type of challenge and is able to include individual symbols or symbol combinations that are not associated with the pay table or conventional triggers.

In another variant of the mystery boost concept, where the stored award field is dynamic (e.g., FIFO), a mystery boost may be inserted into the stored award field not only in an entry point to the stored award field (e.g., a first stored award position), but may instead be inserted into the middle of the stored award field (e.g., the second through fourth stored award positions in a five stored award position field) or at the end of the stored award field (e.g., a first stored award position). Thus, a mystery boost need not always be put into the entry point of a dynamic stored award field. In this manner, a large mystery boost may be inserted in the middle or at a terminal side of the dynamic stored award field and the player has fewer chances to win (or re-win) that award while it remains in the dynamic stored award field. For example, is a 1000 credit value is inserted as a stored award in the sixth (last) stored award position in a 1×6 dynamic stored award field, a player's next winning outcome would push that stored award out of play and, to attain that 1000 credit value, a player would have to achieve the re-award outcome prior to any other winning outcome.

In the above mystery boost examples, the mystery boost was described as a discrete value inserted as a stored award value in a stored award position, presumably one having a "0" stored award value. In yet other aspects, the mystery boost may be a modification to an existing non-zero stored award. In one example, if a mystery boost award is greater than an existing stored award in a particular stored award position, the mystery boost may simply replace the lesser stored award, thereby enhancing the stored award field. In another example, a mystery boost award is a multiplier that is used to multiply an existing stored award in a particular stored award position, thereby enhancing the stored award field. For example, a stored award of 50 credits is multiplied by a 3× mystery boost to suddenly become 150 credits. In still another example, a mystery boost award is a discrete value that is added to an existing stored award in a particular stored award position, thereby enhancing the stored award field. For example, a stored award of 50 credits has added to it a mystery boost of 50 credits to alter the stored award to then be 100 credits. In still another example, a mystery boost award is a mathematical function (addition, multiplication, square, etc.) that is applied to two of the stored awards and one of the stored awards is replaced by the calculated amount. In still another example, one or more numbers in the stored awards could be advantageously jumbled, so that a "45" credit value adjacent a "0" credit value could merge together to form a "450" credit value or a "0" could be taken from a "100" credit value, making that a "10" credit value and the "0" then added to another stored award, such as a "50" to then make that stored award a "500".

In accord with the above examples, a win or a mystery boost can be applied to or added to a randomly chosen one of the stored award positions and stored award, if any, therein. Thus, an award in the base wagering game is modified and, instead of being inserted into a first stored award position 130*a* (see FIG. 13), it is inserted into a second stored award position 130*b* (see FIG. 13) based on a random determination by a RNG. In another example, an award in the base wagering game is modified and, instead of being inserted into a first stored award position 130*a* (see FIG. 13), it is added to the third stored award position 130*c* (see FIG. 13), based on a random determination by a RNG, to build upon the already indicated 400 credits.

A trigger for awarding stored awards, in some aspects, is configured to award a subset of the stored awards in the stored award positions, so that different levels of triggering symbols are configured to yield as an award different numbers of stored award positions. For example, two triggering symbols (e.g., Zeus symbol in FIG. 13) would yield two of the stored award positions and three triggering symbols (e.g., Zeus symbol in FIG. 13) would yield three of the stored award positions. These awarded stored award positions could be randomly determined or, alternatively, there could optionally be a predetermined correspondence between specific symbol positions, or reels (i.e., a grouping of symbol positions), and specific stored award positions. In this way, referring to the example of FIG. 13, the appearance of a single Zeus symbol in reel 2 could cause the stored award in stored award position 130*d* to be awarded and the two Zeus symbols in reel 4 could together act as a multiplier of 2× for the stored award in stored award position 130*b*. Although, in the illustrated example of FIG. 13, this would result in an award of zero, this feature could result in high awards, as two of such triggers in reel 5 would have resulted in an award of 860 credits. Further, the awarded subset of stored awards in stored award positions could be randomly chosen. Continuing with the above example of FIG. 13, the appearance of a single Zeus symbol in reel 2 could cause the award of one randomly determined stored award position and the two Zeus symbols in reel 4 could cause the award of two additional randomly selected one of the stored award positions so that, in total, three of the stored awards in stored award positions 130*a*-130*e* would be awarded.

For a dynamic stored award field having a predetermined number of active positions (e.g., five stored award values), such as is shown by way of example in FIG. 13, a re-award trigger may comprise achieving two of a particular symbol. It is within the present concepts to include a variable dynamic stored award field wherein, upon the attainment of a still less probable outcome (e.g., achieving three of a particular re-award trigger symbol), the re-award would not only comprise the displayed stored award values, but would recover one or more non-displayed stored award values, which may be randomly determined or may be a predetermined number. For example, a player has just sadly observed his or her 5,000 credit value stored award get pushed out of the stored award field to make room for a newly introduced 150 credit winning outcome. In effect, the 5,000 credit value would occupy a sixth stored award position (e.g., 130*f* in FIG. 13 (not shown)) that is not displayed or normally available to the player. However, should the player achieve a special triggering condition, the sixth stored award position and possibly additional, higher stored award positions (e.g., $7^{th}$, $8^{th}$, $9^{th}$, etc.) could also be re-awarded. Thus, a re-award triggering outcome may itself award more than the displayed stored award fields. For example, for any re-award triggering condition, six or seven or eight or more stored award fields may be awarded even though only five stored award fields are displayed. Thus, each time a player is re-awarded the stored award values, the player gets more than is actually displayed.

In at least some aspects of the present concepts, another variant on the dynamic stored award field utilizing a FIFO paradigm comprises a temporal alteration affecting the frequency by which the awards are shifted from a current stored award position to a subsequent stored award field. A particular outcome or mystery trigger may thus alter, for a predetermined time (e.g., a number of plays of a wagering game, a number of spins, a predetermined time period, etc.), a progression of the stored awards. For example, such a particular outcome or mystery trigger may cause the stored award field FIFO frequency to slow to ⅓, such that instead of the stored awards moving every spin, for winning or non-winning outcomes, the stored awards only move every third spin, thereby freezing the stored awards in place for three spins rather than one spin and the "frozen" stored awards may then be altered by such winning outcome(s), mystery boost(s), or even "non-winning" outcomes that are nonetheless associated with some modifier that affects the stored award. In this way, the existing stored award values are supplemented by and increased by further wins during this alteration of the FIFO frequency as it takes longer for each stored award to move, should the player achieve a winning outcome, so that each new winning outcome would be added to any existing stored award value occupying the entry position to the stored award field.

In still further aspects of the present concepts, bonus triggers or components of eligibility may be introduced into a queue of stored awards, either exclusively (i.e., a stored award field containing only bonus triggers or components of eligibility) or in combination with winning outcomes and/or modified winning outcomes as disclosed above. By way of example, if a player wins a bonus, they word "Bonus" may be introduced into the queue of stored awards in the stored award field. In another example, if a player needs three of a particular symbol to trigger a bonus, and the player obtains one such symbol, that symbol would be introduced into the queue of stored awards in the stored award field. In a subsequent play, the player obtains another such symbol, which is introduced into the queue of stored awards in the stored award field as the first symbol is shifted to the next position. At this point, the player would need to obtain one more such symbol for introduction into the queue while the other symbols remain in the queue of the stored award field. In this way, the stored award field is temporarily holding (e.g., in a FIFO model) bonus triggers so that a player has a limited number of plays to accumulate the required components for the bonus or game feature or the like before the components start expiring or dropping off. In one combination with one of the aforementioned concepts, one game feature that might be triggered by an accumulation of eligibility triggers in the stored array field is an expansion of the stored award field from an initial number of stored award positions to an expanded number of stored award positions (e.g., from 5 to 10).

In accord with at least some aspects of the present concepts, instead of a strict FIFO paradigm, variations optionally permit triggers that move wins in the opposite direction so that they stay in the stored award field longer or that anchor a win in place for a predetermined number of turns. In a situation where the stored award values move back, to avoid losing any stored award values, any stored award that would move off the screen and out of the stored award field could be accumulated in the first stored award field. For example, a first state of a stored award field includes five stored award positions respectively having values of 60 credits in a first stored award position, 100 credits in a second stored award position, 30 credits in a third stored award position, 50 credits in a fourth stored award position, and 750 credits in a fifth and last stored award position. Following a triggering of the stored award field reversal feature causing a reversal of 3 positions, where the large award of 750 credits was on the verge of dropping off the stored award field, the second, third and fourth stored awards would be added to the first stored award of 60 credits to yield a first stored award of 240 credits, and the 750 credit stored award from the fifth stored award position would move to the second stored award position. Other degrees of reversal are also contemplated as being within the present concepts, such as one, two, three or more up to the entirety of the stored array field (i.e., n−1, where n is the number of stored awards in the stored award field).

As another variant, where non-winning outcomes (i.e., "0" credits awarded) are used to populate a dynamic stored award field or queue, a particular reel symbol or other triggering condition could pause the progression of the stored award values within the stored award field.

In at least some aspects, a "super spot" or the like could be, by default or by operation of a particularly triggered game feature, inserted into the stored array field in either in a fixed position (e.g., the middle stored award position) or a randomly selected position (e.g., which may be a static randomly determined position or the randomly selected position may change over time or with each turn).

The "super spot" could be visible, or not visible, and may have various attributes, one of which may comprise as a multiplier. If a player triggers a re-award while the "super spot" is active and while a non-zero stored award is disposed in a stored award position corresponding to such "super spot," the stored award is multiplied by the multiplier of the "super spot". In another example, a "super spot" could be a separate accumulator disposed in the stored award field. Thus, the particular stored award location occupied by the "super spot" can hold or accumulate a predefined plurality of stored awards before allowing the stored award to finally move on to a successive stored award location. For example, a third stored award location having a value of 30 credits is associated with a "super spot" (with values of 10 credits in a second stored award location and 150 credits in a first stored award location) and, in a plurality of successive turns, a player wins awards of 60 credits and 100 credits. Instead of the 30 credit stored award being moved on to the fourth and fifth positions, respectively, the 30 credit stored award stays where it is and in the successive turns, the 10 credit award and the 150 credit award are added thereto, so that the third stored award is 190 credits, with the second stored award of 60 credits and the first stored award of 100 credits.

As yet other variants, a "super spot" could also be used to trigger a progressive award or a cascading award. For example, a "super spot" can trigger a progressive award corresponding in size to a size of the highlighted or associated stored award (e.g., a large stored value triggers a comparatively large progressive and a little stored value triggers a comparatively smaller progressive).

In at least some aspects of the present concepts, temporary situations may be created where it's even easier to trigger the re-awarding of one or more stored award values in the stored award field. For example, based on the appearance of an "Easy" symbol in a wagering game, in one or more subsequent turns a player may temporarily be permitted to trigger the re-award by obtaining a single one of the particular symbol trigger rather than being required to achieve two particular symbols in an outcome of the wagering game. A player could be informed of this temporary alteration of the rules by a banner stating "Next Spin=One Bonus Trigger To Win Re-Award".

In at least some aspects of the present concepts, the number of stored award positions corresponds to a number of reel positions and each stored award position is disposed above a corresponding reel. The stored awards achieved through winning outcomes in the wagering game populate the stored award positions, which may be static or dynamic, and individuals ones of the stored awards may be re-awarded when a particular symbol is displayed on the reel below the corresponding stored award position (e.g., the symbol is displayed along an active payline). For example, if a third stored award position above reel 3 indicates a stored award of 250 credits and a "Re-Award" symbol falls along an active payline of reel 3, the player is re-awarded the third stored award of 250 credits. For a static stored award field, the third stored award position would then be available for input of another stored award and, for a dynamic stored award field, the values of the stored awards would then shift. In another aspect, a stored award modifier may occur on a reel disposed beneath the stored award. For example, a multiplier symbol may fall along an active payline beneath a stored award position and the stored award would be multiplied by the value of the multiplier symbol. Of course, at this point, neither the stored award nor the stored award field has actually been awarded, but the total value of the stored award field has been increased.

In still other aspects, the cumulative value of the stored awards may determine a degree of a bonus received upon triggering of the bonus. For example, if a player triggers a free spin bonus, a first level of stored awards (e.g., between 0 and 250 credits) yields a first number of free spins in the free spin bonus (e.g., 5 spins), a second level of stored awards (e.g., between 250 and 500 credits) yields a second number of free spins in the free spin bonus (e.g., 10 spins), a third level of stored awards (e.g., between 500 and 1000 credits) yields a third number of free spins in the free spin bonus (e.g., 15 spins), and a fourth level of stored awards (e.g., above 1000 credits) yields a fourth number of free spins in the free spin bonus (e.g., 20 spins).

In yet other aspects, as each free spin or each game feature has a defined expected value and the stored award field itself has an expected value, a player may be provided with an option to engage in a game feature that has an expected value corresponding to the expected value of the stored awards field. For example, $8.33 in the stored award field could equal 22 free spins. So a player could opt to convert the expected value of $8.33 in the stored award field into another form of expected value, such as 22 free spins. If a stored award field has 830 credits, an equivalent number of free spins may be determined and the free spins could then be triggered off of the reels, just as the re-award of the stored award credits could be triggered off of the reels. To highlight this information to a player, the primary display 14 may display a first meter that adds up the value of the stored awards currently in the stored award field and a second meter shows a number of free spins equivalent to the value displayed in the first meter.

Of course, a player opting for such conversion of stored awards to another expected value currency could win awards greater than or less than the indicated value of the stored awards. So a player may trade in their stored award win for its equivalency in number of free spins or in another other desired type of bonus or game feature. In other aspects, a player may not be permitted to choose the form of expected value conversion and, instead, the nature of the conversion may be randomly selected by a symbol or symbol combination on the reels. For example, one trigger would convert the stored award values in the stored award field into free spins, another trigger would directly award the stored award values in the stored award field or queue, and yet another trigger would convert the stored award values in the stored award field into a pick field of selectable elements having an equivalent expected value.

In at least some aspects of the present concepts, such as shown by way of example in FIG. 6, the cumulative value of the stored award field may be used to influence a multiplier of the icon 110, with a higher cumulative value of the stored award field producing relatively higher multipliers for application to a winning outcome that is to be both awarded and stored in the stored award field and correspondingly with a lower cumulative value of the stored award field producing relatively lower multipliers for application to a winning outcome that is to be both awarded and stored in the stored award field. Thus, the expected value of the stored award field may be utilized to influence, such as through a multiplier, the award for a winning outcome and, correspondingly, the associated stored award value.

In one variant on a free spin bonus, a number of spins to be awarded in a free spin bonus is determined by a random number generator that displays (e.g., via a scrolling number wheel or a meter), at different intervals, a number of spins that would be awarded if the player was to retrigger the re-awarding of the stored awards in the stored award field. So, occasionally, there could be this giant number of free spins that a player would receive if they were able to trigger the re-awarding of the stored awards in the stored award field within a number of plays of the wagering game within that interval (e.g., in the next five spins, etc.).

Further, a size of a player's winning outcome, as modified by icon 110 or as modified by operation of other factors described herein, may influence a number of free spins available if a player were to trigger the re-awarding of the stored award values in the stored award field. For example, a player's winning outcome may result in a number (e.g., 5) to be displayed in a free spin meter or the like, and then if the player were to retrigger the re-awarding of the stored award values in the stored award field while that number is up in the box, the player would receive that number of free spins worth the sum of the pot.

In a conventional free spin bonus, a number of free spins are provided and there is a potential of retriggering another free spin bonus during the first free spin bonus. In accord with at least some aspects of the present concepts, instead of having a predetermined number of additional free spins that may be triggered during a free spin bonus, the number of additional free spins that may be retriggered may be variable and that number of free spins that are retriggered would be based on stored award values in a stored award field, with the stored award values in the stored award field being populated by the win amounts that occur during the free spin bonus. By way of example, if a first free spin was a giant award, that may result in an associated number (e.g., 5 free spins) being put into a first stored award position in a stored award field, that stored award awarding the possibility of retriggering 5 free spins. A second free spin resulted in no award, so a stored award of zero is inserted into the first stored award position and the previous first stored award (e.g., 5) is moved to a second stored award position. The third free spin results in a medium award, that may result in an associated number (e.g., 2 free spins) being put into a first stored award position in a stored award field, with the other values of zero and five being moved, respective to the second and the third stored award positions in the stored award field. In this example, if the player hits a re-award or retrigger on the next free spin, the player gets 8 extra free spins at the end of the original free spin bonus. So, in this aspect of the present concepts, the stored award field is used to inform the player of how many additional free spins they can get if they retrigger the free spin bonus, so the stored awards are not award amounts, per se, but rather a number of free spins, and that number of free spins is based on the size of the win in the free spin round.

Returning to the Jackpot Party Mega-Multiplier game described above (see, e.g., FIG. 6), in lieu of a mystery boost or an icon affecting any winning outcome in a predetermined manner, a player's extra wager may enable a particular symbol to generate one or more stored awards when that symbol is represented either anywhere in the outcome or, alternatively, along a payline. Thus, when the particular symbol falls twice along a payline, two stored award positions could be populated with a randomly determined awards. Thus, similar to the aforementioned mystery boost, a player doesn't have to achieve a winning outcome to populate to stored award positions in the stored award field.

Previously, it was described that icon 110 would modify an award associated with a winning outcome and that that value would both be awarded to the player and added to the stored award field as a stored award value. In another variant, rather than having multipliers or other modifiers applied to the winning outcome prior to depositing of the award to the stored award field, a fixed distribution of multipliers or other modifiers may be applied to the stored award field after the stored award positions in the stored award field are filled. A predetermined number of modifiers (e.g., multiplier, amount to be added, etc.), which optionally have predefined values, are randomly applied to the stored award values in the stored award field. For example, if there are five stored award positions, multipliers having values of "10×," "5×," "3×," "2×," and "1×" are randomly applied to the stored awards in the stored award positions. Thus, the modification of stored awards may occur at the time of award generation and population of the stored award fields, or such modification may occur later, or a hybrid approach may be adopted, with some values being modified prior to or concurrent with the population of the stored award fields and some values being modified after population of the stored award fields.

While the best modes for carrying out the present invention have been described in detail, those familiar with the art to which this invention relates will recognize various alternative designs and embodiments for practicing the invention within the scope of the appended claims. Each of the above embodiments and obvious variations thereof is contemplated as falling within the spirit and scope of the claimed invention, which is set forth in the following claims. As one example, in a Hollywood-themed wagering game where a player, via adaptive gaming, assumes the role of a star of a movie shoot and, over time, completes or unlocks scenes from a movie having a player-selected genre (e.g., mystery, romance, sci-fi, action/adventure, etc.), a player is presented with a bonus round comprising a free spin bonus (e.g., 10 free spins). After the free spin bonus is over, the voice of the movie director comes on and says "Ok, that was good, but let's just have ONE more take" or words to that effect. The primary and/or secondary display(s) then show(s) thumbnails of the final spin positions of all of the free spins in the bonus, both the winning outcomes and losing outcomes, and the player is then permitted to reconsider their prior bonus wager and provided with the option to make another, possibly different bonus bet. Following acceptance or refusal of this option, one of the free spin results is chosen at random and that win is given again, optionally being multiplied by the player's additional buy-in bet. This allows the player the potential to "re-live" the win (or possibly the loss). Here, the player gets to see that some of their free spins were winners and they get to see the magnitude of their wins and, with the benefit of this information, the player can choose to wager more if they think they can win more. The ability to retrigger the bonus could be another way to re-live the win.

Further, although the above-described examples centered on a reel-based wagering game, the same principles and concepts can be applied to other types of wagering games such as, but not limited to, card-based games (e.g., Texas Hold 'Em, etc.).

The invention claimed is:

1. A gaming system for playing a wagering game, comprising:
- a wager input device configured to receive a wager to play the wagering game;
- at least one display device configured to display the wagering game; and
- at least one controller operatively configured to:
  - (a) randomly generate an outcome of the wagering game;
  - (b) randomly generate an award modifier;
  - (c) determine if the outcome is a winning outcome;
  - (d) determine an award associated with the outcome if the outcome is a winning outcome and award the award to a player;
  - (e) modify the award via the award modifier to yield a modified award;
  - (f) store the modified award in a stored award field accessible through a stored award field trigger;
  - (g) repeat the acts of (a) through (f) through multiple instances of the wagering game to at least partially populate the stored award field with a plurality of modified awards; and
  - (h) initiate a secondary game, in response to an occurrence of the stored award field trigger, the stored award field being accessible to the player via the secondary game, the stored award field including a secondary game picking field having a plurality of selectable elements, each modified award stored in the stored award field is associated with at least one of the plurality of selectable elements, and wherein the selection of one or more of the plurality of selectable elements yields a secondary game award.

2. The gaming system of claim 1, wherein the award modifier is a multiplier.

3. The gaming system of claim 1, wherein the award modifier is a function.

4. The gaming system of claim 3, wherein the award modifier function comprises a game feature trigger.

5. The gaming system of claim 4, wherein the game feature is triggered to produce a game feature outcome and wherein the stored award is modified by the game feature outcome.

6. The gaming system of claim 4, wherein the award is stored together with the game feature trigger in the stored award field, and wherein the game feature is accessible through the secondary game.

7. The gaming system of claim 5, wherein the game feature outcome comprises a credit amount, and wherein the credit amount is added to the award associated with the winning outcome to yield the modified award.

8. The gaming system of claim 5, wherein the game feature outcome comprises a multiplier, and wherein the multiplier is applied to the award associated with the winning outcome to yield the modified award.

9. The gaming system of claim 1, wherein the at least one controller is further operatively configured to verify receipt of a wager and an extra wager as a precondition for randomly generating the award modifier.

10. The gaming system of claim 9, wherein the extra wager comprises one-half of the total line wager.

11. The gaming system of claim 1, wherein the award modifier is displayed on the at least one display device at least prior to the display of the outcome of the wagering game.

12. The gaming system of claim 1, wherein the stored award field trigger occurs directly in the base wagering game.

13. The gaming system of claim 1, wherein the secondary game award awarded in association with the secondary game comprises a sum of any award or awards associated with the one or more selected selectable elements.

14. The gaming system of claim 1, wherein the secondary game picking field of selectable elements comprises selection-ending outcomes associated with one or more randomly selected selectable elements.

15. The gaming system of claim 14, wherein the secondary game picking field of selectable elements comprises selection-preserving outcomes associated with one or more randomly selected selectable elements.

16. The gaming system of claim 14, wherein the secondary game is configured to permit a predetermined number of selections of selectable elements and to terminate the secondary game upon selection of said predetermined number of selections of selectable elements.

17. The gaming system of claim 1, wherein the at least one controller is further operatively configured to:
- apply the award modifier to a stored award in the stored award field during a wagering game or during the secondary game.

18. The gaming system of claim 17, wherein the award modifier is a credit value.

19. The gaming system of claim 18, wherein the stored award field comprises a plurality of stored award positions within the picking field forming a first-in-first-out queue, and wherein the award modifier is applied to a stored award position other than an entry stored award position in the first-in-first-out queue.

20. The gaming system of claim 17, wherein the award modifier comprises a function or a multiplier.

21. The gaming system of claim 1, wherein the stored award field trigger is player initiated.

22. A gaming system for playing a wagering game, comprising:
- a wager input device configured to receive a wager to play the wagering game;
- at least one display device configured to display the wagering game; and
- at least one controller operatively configured to:
  - (a) randomly generate an outcome of the wagering game;
  - (b) determine if the outcome is a winning outcome;
  - (c) determine an award associated with the outcome if the outcome is a winning outcome;
  - (d) award the award to a player;
  - (e) store the award in a stored award position in a stored award field accessible through a stored award field trigger in a wagering game or in a secondary game; and (f) modify a stored award in the stored award field to increase a value of the stored award subsequent to the storing of the award in the stored award field;

(g) repeat the acts of (a) through (f) through multiple instances of the wagering game to at least partially populate the stored award field with a plurality of modified awards;

(h) initiate a secondary game, in response to an occurrence of the stored award field trigger, the stored award field being accessible to the player via the secondary game, the stored award field including a secondary game picking field having a plurality of selectable elements, each modified award being stored in the stored award field is associated with a respective one of the selectable elements; and (i) award at least one of the modified awards to the player in response to the selection of at least one of the plurality of selectable elements associated therewith.

23. The gaming system of claim 22, wherein the modification of the stored award is a randomly determined outcome independent of any particular displayed outcome in a wagering game.

24. The gaming system of claim 22, wherein the modification of the stored award is dependent on an occurrence of a particular outcome in a wagering game conducted subsequent to the wagering game that caused to award to be stored in a stored award position in a stored award field.

25. A gaming system for playing a wagering game, comprising:

a wager input device configured to receive a wager to play the wagering game;

at least one display device configured to display the wagering game; and at least one controller operatively configured to:

store a plurality of stored award values in a stored award field, the stored award values being generated using prior awards, corresponding to winning outcomes previously won in the wagering game, or being generated randomly in the absence of a winning outcome in the wagering game during a previous instance of the wagering game, at least some of the stored award values being modified by an award modifier contemporaneously with or subsequent to storing in the stored award field;

calculate an expected value of the stored award values in the stored award field;

conduct a bonus game, in response to a stored award field trigger occurring in the wagering game, utilizing the stored award values, the bonus game having an expected value commensurate with the calculated expected value of the stored award values in the stored award field, the bonus game includes a bonus game picking field having a plurality of selectable elements, in which the stored award field is accessible to a player through the secondary game, wherein each modified award stored in the stored award field is associated with a respective one of the selectable elements, and wherein a player is permitted to select one or more of the selectable elements;

determine a bonus award associated with the bonus game based on the one or more selected selectable elements;

award the bonus award associated with bonus game; and clear the stored award values in the stored award field.

26. The gaming system of claim 25, wherein the at least one controller is further configured to: enable a player to purchase the selectable elements of the stored award field, following completion of the bonus game, for a value corresponding to the calculated expected value of the stored award values in the stored award field, the value optionally including a rake value.

27. The gaming system of claim 25, wherein the at least one controller is further configured to:

provide an option to select, via a player-input device, amongst plurality of separate bonus games in which the expected value is at least substantially similar;

conduct a selected one of the plurality of separate bonus games;

determine an award associated with the selected one of the plurality of separate bonus games;

award the award associated with the selected one of the plurality of separate bonus games; and clear the stored award values in the stored award field.

28. The gaming system of claim 27, wherein the plurality of separate bonus games comprises a picking game and a free spin game.

29. A method of conducting a wagering game on a gaming system, the method comprising:

a) receiving a wager via a wagering input device to play the wagering game on the gaming system;

b) displaying an award modifier on at least one display device;

c) using the award modifier to modify an award associated with a winning outcome in the wagering game to yield a modified award;

d) storing the modified award as a stored award in a stored award field, the stored award field being accessible through a stored award field trigger in the wagering game or in a secondary game;

e) repeating the acts (a) through (d) to at least partially populate the stored award field with stored awards;

f) accessing the stored awards via at least a secondary game, initiated in response to the occurrence of the stored award field trigger in the wagering game, in which the stored award field is accessible to a player, the stored award field including a secondary game picking field of a plurality of selectable elements, wherein each stored award stored in the stored award field is associated with a respective one of the selectable elements, and wherein the player is permitted to select one or more of the selectable elements; and g) awarding at least one of the stored awards.

30. The method of claim 29, wherein the award modifier comprises one of a multiplier, a function, a game feature trigger, or a portion of a game feature trigger.

31. The method of claim 30, wherein the secondary game is further configured to be initiated responsive to a player instruction to initiate the secondary game.

32. The method of claim 30, wherein the secondary game is further configured to be initiated when all of a plurality of stored award positions in the stored award field have been assigned a non-zero value.

33. The method of claim 30, wherein the method further comprises the acts of:

receiving the one or more player selections of the selectable elements until a selection-ending outcome occurs; and awarding a sum of the stored awards associated with the selected selectable elements.

* * * * *